US012259362B2

(12) United States Patent
Smith et al.

(10) Patent No.: US 12,259,362 B2
(45) Date of Patent: Mar. 25, 2025

(54) NON-DESTRUCTIVE INSPECTION STATION FOR AIRCRAFT FUSELAGE SECTIONS FABRICATED IN AN ASSEMBLY LINE

(71) Applicant: The Boeing Company, Chicago, IL (US)

(72) Inventors: Daniel R. Smith, Woodinville, WA (US); Darrell D. Jones, Mill Creek, WA (US); Barry A. Fetzer, Renton, WA (US); Jeremy Evan Justice, Mill Creek, WA (US); James C. Kennedy, Port Angeles, WA (US)

(73) Assignee: The Boeing Company, Chicago, IL (US)

( * ) Notice: Subject to any disclaimer, the term of this patent is extended or adjusted under 35 U.S.C. 154(b) by 579 days.

(21) Appl. No.: 17/454,294

(22) Filed: Nov. 10, 2021

(65) Prior Publication Data
US 2022/0155260 A1    May 19, 2022

Related U.S. Application Data

(60) Provisional application No. 63/115,038, filed on Nov. 18, 2020.

(51) Int. Cl.
*G01N 29/27* (2006.01)
*G01N 29/06* (2006.01)
(Continued)

(52) U.S. Cl.
CPC ......... *G01N 29/27* (2013.01); *G01N 29/0654* (2013.01); *G01N 29/225* (2013.01);
(Continued)

(58) Field of Classification Search
CPC .. G01N 29/27; G01N 29/0654; G01N 29/225; G01N 29/28; G01N 2291/023;
(Continued)

(56) References Cited

U.S. PATENT DOCUMENTS 3,375,706 A * 4/1968 Pandelis ................ G01N 29/27
73/644
6,131,460 A 10/2000 Brunty et al.
(Continued)

FOREIGN PATENT DOCUMENTS

JP  H07281171 A  10/1995
JP  2017090289 A  5/2017

OTHER PUBLICATIONS

European Patent Office Extended Search Report, dated Mar. 11, 2022, regarding Application No. EP21207617.8, 12 pages.
(Continued)

*Primary Examiner* — Tarun Sinha
(74) *Attorney, Agent, or Firm* — Yee & Associates, P.C.

(57) ABSTRACT

Systems and methods are provided for inspecting aircraft fuselages. Non-Destructive Inspection (NDI) stations inspect sections of a fuselage via pulsed-line assembly techniques. After each pulse, a section of fuselage is moved by less than its length, and one or more NDI stations disposed at different portions of the section to inspect the section of fuselage for out-of-tolerance conditions. A method for inspecting a structure for inconsistencies which includes advancing a structure along a track in a process direction through a Non-Destructive Inspection (NDI) station, indexing the structure to the NDI station and inspecting the structure with the NDI station.

27 Claims, 10 Drawing Sheets

(51) Int. Cl.
  *G01N 29/22* (2006.01)
  *G01N 29/28* (2006.01)
  *G05B 19/4155* (2006.01)
(52) U.S. Cl.
  CPC ......... *G01N 29/28* (2013.01); *G05B 19/4155* (2013.01); *G01N 2291/023* (2013.01); *G01N 2291/0289* (2013.01); *G01N 2291/044* (2013.01); *G01N 2291/048* (2013.01); *G01N 2291/106* (2013.01); *G01N 2291/2694* (2013.01); *G05B 2219/37206* (2013.01)
(58) Field of Classification Search
  CPC ..... G01N 2291/0289; G01N 2291/044; G01N 2291/048; G01N 2291/106; G01N 2291/2694; G01N 2291/0231; G01N 29/265; G01N 29/4472; G01N 29/043; G05B 19/4155; G05B 2219/37206; B64F 5/10; B64F 5/50; B64F 5/60
  See application file for complete search history.

(56) References Cited

U.S. PATENT DOCUMENTS

| | | | |
|---|---|---|---|
| 6,298,727 B1 * | 10/2001 | Fleming | G01N 29/22 |
| | | | 73/644 |
| 6,367,330 B1 | 4/2002 | Schafer | |
| 2008/0307886 A1 * | 12/2008 | Marsh | G01N 29/265 |
| | | | 73/601 |
| 2010/0313664 A1 * | 12/2010 | Cain, Jr. | G01N 29/07 |
| | | | 73/623 |
| 2014/0346095 A1 | 11/2014 | Kujacznski et al. | |
| 2015/0255421 A1 | 9/2015 | Hirose | |
| 2015/0329221 A1 * | 11/2015 | Georgeson | G01N 29/0654 |
| | | | 702/36 |
| 2017/0284973 A1 | 10/2017 | Falter et al. | |
| 2018/0366357 A1 | 12/2018 | Liao et al. | |
| 2019/0030588 A1 | 1/2019 | Hirai et al. | |
| 2019/0173574 A1 | 6/2019 | Georgeson et al. | |
| 2020/0034495 A1 | 1/2020 | Riding et al. | |
| 2020/0236987 A1 | 7/2020 | Casagrande et al. | |

OTHER PUBLICATIONS

Netherlands Patent Office Written Opinion and Search Report with English Translation, dated Oct. 12, 2021, regarding Application No. NL2028122, 14 pages.

European Office Action dated Apr. 18, 2024, regarding EP21207617. 8, 6 pages.

* cited by examiner

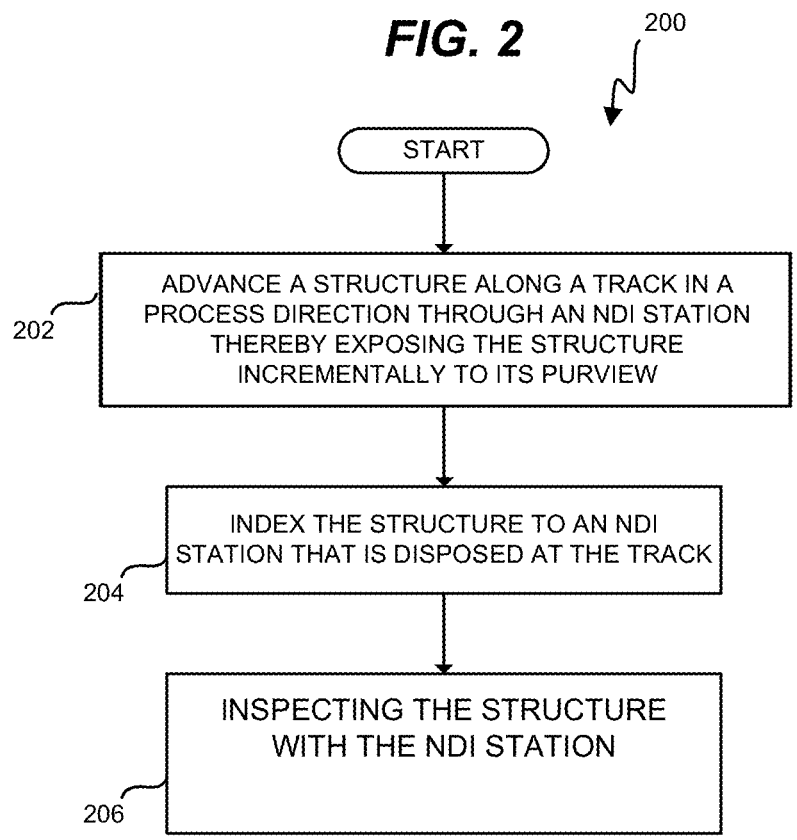

NON-DESTRUCTIVE INSPECTION STATION FOR AIRCRAFT FUSELAGE SECTIONS FABRICATED IN AN ASSEMBLY LINE

CROSS-REFERENCE TO RELATED APPLICATION

This application claims the benefit of U.S. Provisional Patent Application Ser. No. 63/115,038, filed Nov. 18, 2020, and entitled "Non-Destructive Inspection Station for Aircraft Fuselage Sections Fabricated in an Assembly Line;" which is incorporated herein by reference in its entirety.

FIELD

The disclosure relates to the field of assembly, and in particular, to assembly of airframes.

BACKGROUND

An airframe defines the mechanical structure of an aircraft. Airframes are made of multiple components that provide desired structural properties. For example, a portion of an airframe for a fuselage of an aircraft may include frames, skin, and stringers that are mechanically coupled together (e.g., via co-bonding, co-curing, or fasteners) in accordance with design parameters. As presently practiced, components of an airframe are fabricated and assembled in predefined cells on a factory floor. For example, a preform for a fuselage section of an aircraft may be hardened at one cell into a composite part, and then may be transported to a new cell that is dedicated solely to inspection processes. The composite part is then scanned and indexed as part of the inspection process.

While the fabrication processes discussed above are reliable, they encounter delays when work at a specific portion of a component is completed more slowly than expected. For example, if a particular portion of a fuselage section takes longer than expected for installation of frames, then the entire section remains at the cell until all of the work that has been delayed is completed or the entire section moves out of the cell with the work that has been delayed completed outside of the cell.

Therefore, it would be desirable to have a method and apparatus that take into account at least some of the issues discussed above, as well as other possible issues.

SUMMARY

Embodiments described herein provide Non-Destructive Inspection (NDI) stations that inspect sections of fuselage that have been fabricated via pulsed-line assembly techniques. After each pulse, a section of fuselage is moved by less than its length, and one or more NDI stations disposed at different portions of the section inspect the section for out-of-tolerance conditions. This technique provides a technical benefit by integrating transportation processes into inspection processes.

One embodiment is a method for inspecting a structure for inconsistencies which includes advancing a structure along a track in a process direction through a Non-Destructive Inspection (NDI) station, indexing the structure to the NDI station and inspecting the structure with the NDI station.

Another embodiment is a non-transitory computer readable medium embodying programmed instructions which, when executed by a processor, are operable for performing a method for inspecting a structure for inconsistencies. The method includes advancing a structure along a track in a process direction through a Non-Destructive Inspection (NDI) station, indexing the structure to the NDI station and inspecting the structure with the NDI station.

Another embodiment is a system for inspecting structures for inconsistencies, the system including a track along which structures advance in a process direction during fabrication and a Non-Destructive Inspection (NDI) station that is disposed at the track and that inspects the structures for inconsistencies. The NDI station includes at least one NDI head that characterizes internal features of a cross-section of each structure.

Yet another embodiment is directed to an apparatus for inspecting structures for inconsistencies which includes a Non-Destructive Inspection (NDI) station. The NDI station includes a frame, at least one NDI head mounted to the frame, a track for advancing a structure relative to the NDI head and an index system for conveying information concerning the structure within purview of the NDI station.

Other illustrative embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

FIG. 2 is a flowchart illustrating a method for operating an assembly line to inspect sections of fuselage in an illustrative embodiment.

DESCRIPTION

The figures and the following description provide specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Airframes may be made from metal or may be implemented as composite parts. Composite parts, such as Carbon Fiber Reinforced Polymer (CFRP) parts, are initially laid-up in multiple layers that together are referred to as a preform. Individual fibers within each layer of the preform are aligned parallel with each other, but different layers may exhibit different fiber orientations in order to increase the strength of the resulting composite part along different dimensions. The preform may include a viscous resin that solidifies in order to harden the preform into a composite part. Carbon fiber that has been impregnated with an uncured thermoset resin or a thermoplastic resin is referred to as "prepreg." Other types of carbon fiber include "dry fiber" which has not been impregnated with thermoset resin but may include a tackifier or binder. Dry fiber may be infused with resin prior to curing. For thermoset resins, the hardening is a one-way process referred to as curing, while for thermoplastic resins, the resin may reach a viscous form if it is re-heated.

Figure 1:
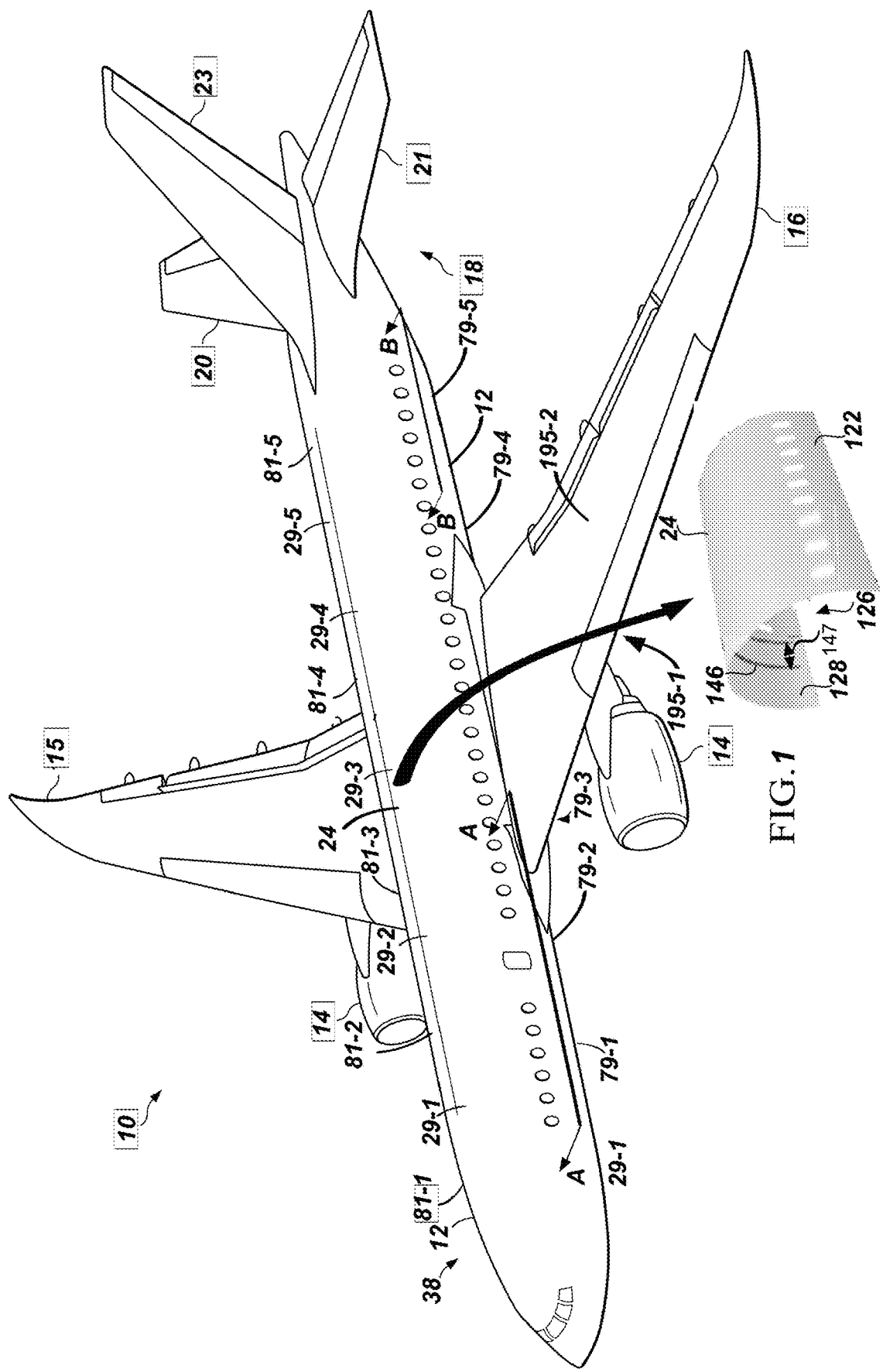
FIG. 1 is an illustration of an aircraft in which an illustrative embodiment may be implemented.

Turning now to FIG. 1, an illustration of an aircraft is depicted in which an illustrative embodiment may be implemented. Aircraft 10 is an example of an aircraft which can be formed of half barrel sections 24 of FIG. 1A, respectively. Aircraft 10 is an example of an aircraft 10 which is formed of half barrel section 24 of fuselage 12.

In this illustrative example, aircraft 10 has wing 15 and wing 16 attached to fuselage 12. Aircraft 10 includes engine 14 attached to wing 15 and engine 14 attached to wing 16.

Fuselage 12 has tail section 18 and a nose section 38. Horizontal stabilizer 20, horizontal stabilizer 21, and vertical stabilizer 23 are attached to tail section 18 of fuselage 12.

Fuselage 12 is fabricated from half barrel sections 24 with an upper half barrel section 81-1, 81-2, 81-3, 81-4, 81-5 joined to a lower half barrel section 79-1, 79-2, 79-3, 79-4, 79-5 to form a full barrel section 29-1, 29-2, 29-3, 29-4, 29-5. The full barrel section 29-1, 29-2 corresponds to view A-A and full barrel section 29-5 corresponds to view B-B and are serially fastened into fuselage 12.

Wing 15 and 16 are formed of wing panels comprising upper wing panel 195-2 and a lower wing panel 195-1 joined together.

Figure 1A:
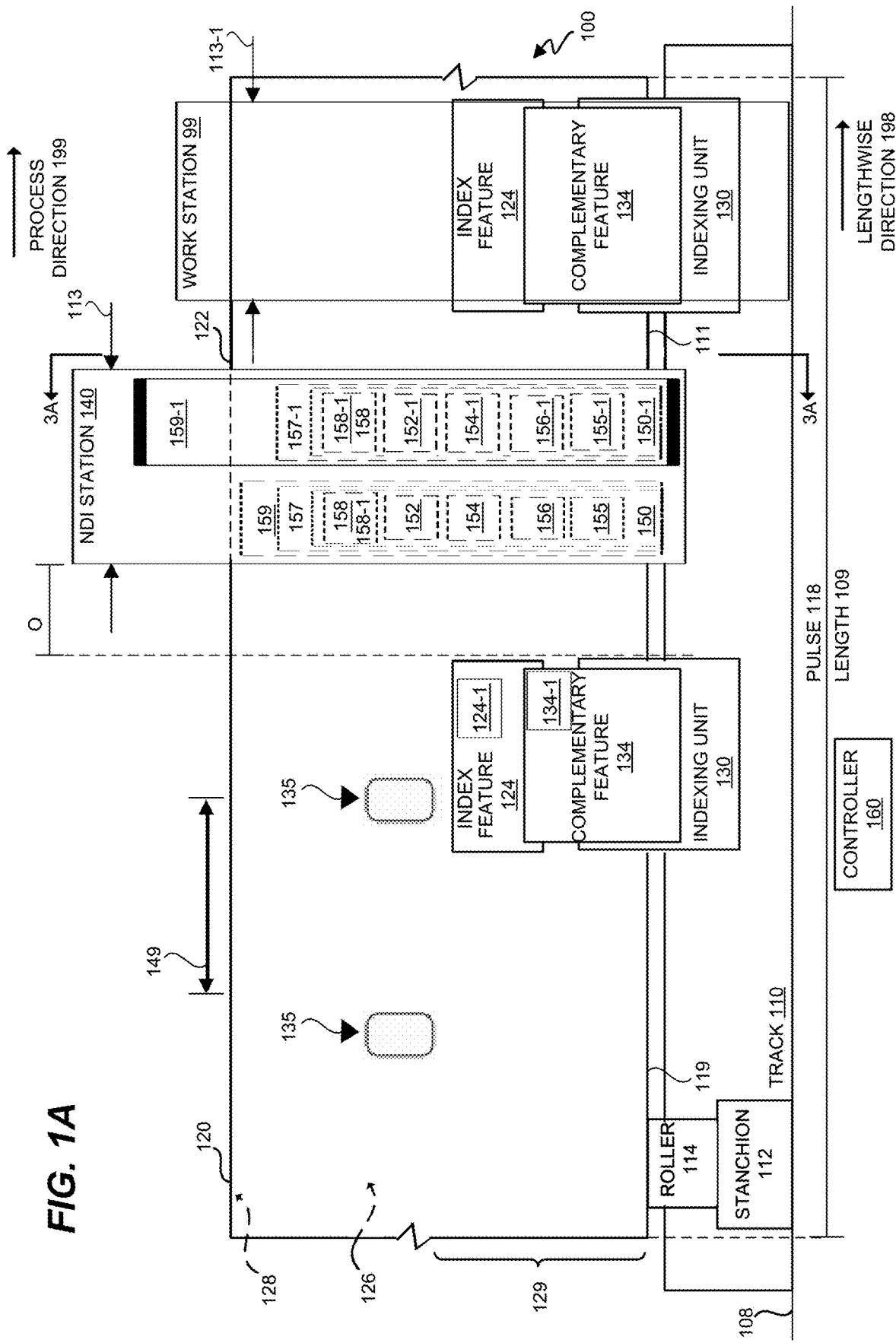
FIGS. 1A-1B are block diagrams of assembly lines that include a Non-Destructive Inspection (NDI) station in an illustrative embodiment.

FIG. 1A is a block diagram of an assembly line 100 that includes a Non-Destructive Inspection (NDI) station 140 for a half barrel section 120 that is being fabricated in an illustrative embodiment. Assembly line 100 comprises any system, apparatus, device, or component operable to iteratively advance a structure (e.g., a half barrel section 120 of a fuselage) along a track 110, or to continuously move the structure along the track 110. Advancing the half barrel section 120 by its length or more than its length is a full pulse 118, or by less than its length is a micro pulse 149. Assembly line 100 is further capable of inspecting the half barrel section 120 via NDI inspection (e.g., visual, ultrasonic, laser, etc.) while the half barrel section 120 is paused between micro pulses 149 and/or during micro pulses 149 between pauses, or while the half barrel section 120 is continuously moved in a process direction 199. The micro pulse 149 is set at a fraction or multiple of frame pitch 147 between frames 146 in FIG. 1. In further embodiments, the NDI inspection is performed by fixed inspection devices which perform inspection as the half barrel section 120 is advanced. Upper half barrel section 81-1, 81-2, 81-3, 81-4, 81-5 and lower half barrel section 79-1, 79-2, 79-3, 79-4, 79-5 in FIG. 1 are fully assembled versions of half barrel section 120 and ready for joining to other fully assembled upper half barrel sections or lower half barrel sections.

The half barrel section 120 comprises a portion of an airframe of approximately twenty feet to approximately forty feet long. Half barrel section 120 is shown with a length 109 which is not illustrated to actual scale. Likewise, half barrel section 120 is shown with a manufacturing excess 129 which is not illustrated to actual scale. Similarly, half barrel section 120 is shown in relation to NDI station 140 and work station 99 and micro pulse 149 which are not illustrated to actual scale. Manufacturing excess 129 is located above and includes bearing edge 119. Another manufacturing excess 135 is the material removed to form the window opening. In some embodiments, the half barrel section 120 comprises a hardened composite part, such as a section of the skin of an aircraft awaiting installation of stringers and frames 146 to enhance rigidity. The half barrel section 120 includes an Outer Mold Line (OML) 122 and Inner Mold Line (IML) 128 and defines a concavity 126 (seen clearly in FIG. 1).

In this embodiment, assembly line 100 comprises track 110, upon which the half barrel section 120 is moved in a process direction 199. The track 110 comprises one or more rails 111, rollers 114 and stanchion 112 that facilitate motion (e.g., rolling or sliding) of the half barrel section 120 along the track 110. In further embodiments, the track 110 includes a chain drive, motorized cart, powered rollers 114 on top of stanchions 112, or other powered system that is capable of moving the half barrel section 120 in the process direction 199.

Assembly line 100 further comprises indexing units 130. Each indexing unit 130 is designed to physically couple with an index feature 124, such as a machined feature such as a hole or slot and/or an added feature such as a pin in the half barrel section 120. The index features 124 are placed at locations along the half barrel section 120. In one embodiment, each of the index features 124 is separated by a distance such as micro pulse 149 or a fraction or multiple thereof along the half barrel section 120. In an embodiment, each of the index features 124 is separated by the different distances along the half barrel section 120. In another embodiment, each of the index features 124 are not linearly aligned in lengthwise direction 198 along the half barrel section 120. In further embodiments, the index features 124 are disposed in a manufacturing excess 129, 135 of the half barrel section 120, which is trimmed away prior to the half barrel section 120 entering service.

In further embodiments, tracking with Radio Frequency Identifier (RFID) is used for indexing. The RFID tag 124-1 is located in the manufacturing excess 129, 135 as part of an index feature 124. The RFID scanner 134-1 is part of complementary feature 134. The RFID tag 124-1 is mounted singularly or along with other index feature 124 in locations optimal to conveying indexing information to NDI station 140. The RFID scanner 134-1 is mounted singularly or along with other complementary features 134 in locations optimal for communicating with index feature 124 including RFID tag 124-1 to conveying indexing information to NDI station 140. The indexing conveys information to NDI station 140 about half barrel section 120 within the purview 113 of NDI station 140. In such an embodiment, the RFID tag 124-1 themselves are used as the indexing features 124, and are serially located, (e.g., linearly aligned or non-linearly aligned) upon the manufacturing excess 129, 135 of the half barrel section 120. The indexing feature 124 including RFID tags 124-1 align with the complementary features 134 located relative to NDI station 140 and work station 99. The indexing feature 124 including RFID tags 124-1 communicate specifics of desired 3D characterization, representation and/or orientation of IML 128 and OML 122 for the half barrel section 120 via indexing unit 130 to controller 160. The operations of the track 110, NDI station 140, work station 99 and/or other components are managed by controller 160. In some embodiments, these index features 124, including RFID tags 124-1, also include instructions for work to be performed by the NDI station 140 and work station 99. For example, in an embodiment where NDI station 140 and/or work station 99 perform work on purviews 113, 113-1 of a half barrel section 120 at the same time. An embodiment has an upper half barrel section 81-1, 81-2, 81-3, 81-4, 81-5 followed by a lower half barrel section 79-1, 79-2, 79-3, 79-4, 79-5 progressing serially down assembly line 100. Another embodiment has the half barrel section 120 of one model followed by the half barrel section 120 of a different model. The indexing feature 124 on each half barrel section 120 communicates to the NDI station 140 and/or work station 99 what, if any, work needs to be completed on the particular section within purview 113, 113-1 as it pauses between micro pulses 149 or during micro pulses 149 through NDI station 140 and/or work station 99. The indexing feature 124 also communicates the OML 122 and IML 128 information during indexing.

In one embodiment, controller 160 determines a progress of the half barrel section 120 along the track 110 based on indexing input from a technician or artificial intelligence in accordance with an automated process such as input from a camera or physical sensor, such as a linear or rotary actuator. Work is performed on half barrel section 120 purview 113, 113-1 in NDI station 140 and/or work station 99, respectively, based upon index conveyed information to NDI station 140 and/or work station 99. Then controller 160 instructs the NDI station 140 and/or work station 99. The controller 160 uses this input to manage the operations half barrel section 120 purview 113, 113-1 in NDI station 140 and/or work station 99 in accordance with instructions stored in a Numerical Control (NC) program. Controller 160 may be implemented, for example, as custom circuitry, as a hardware processor executing programmed instructions, or some combination thereof.

In this embodiment, each of the indexing units 130 includes a complementary feature 134 for insertion into, grasping, or otherwise fitting with an index feature 124. Complementary feature 134 for insertion into, grasping, or otherwise fitting with an index feature 124 provides a hard stop at the end of a micro pulse 149. Indexing units 130 are placed at locations relative to the NDI station 140 and/or work stations 99 and track 110. Indexing units 130 are fixed relative to NDI station 140 and/or work station 99 for embodiment hard stops at the ends of micro pulse 149. Indexing units 130 are not fixed relative to NDI station 140 and/or work station 99 for indexing during micro pulse 149 or continuous assembly. An embodiment has half barrel section 120 micro pulse 149 a distance at least equal to the shortest distance between index features 124 and indexed to the indexing units 130 and worked upon by the NDI station 140. That is, the half barrel section 120 is indexed as part of a micro pulse 149 or continuous system. Whenever the index features 124 in the half barrel section 120 and the complementary features 134 in the indexing units 130 are mated, the location of the half barrel section 120 is indexed to a known location and the 3D characterization, representation and/or orientation of the half barrel section 120 relative to the track 110, the indexing units 130, and the NDI station 140 and/or work station 99 is known. Specifically, and embodiment has each indexing unit 130 disposed at a known offset (O) (e.g., along three axes) from the NDI station 140 and/or work station 99, meaning that the act of indexing a half barrel section 120 to the indexing units 130 causes the position of the half barrel section 120 OML 122 and/or IML 128 relative to the NDI station 140 to be known. This embodiment is illustrated with indexing unit 130 offset (O) from NDI Station 140. Another embodiment has each indexing unit 130 disposed without offset (O) from the NDI station 140 and/or work station 99. This embodiment is illustrated with indexing unit 130 at work station 99. With or without the offset relative to NDI station 140 and/or work station 99, indexing a half barrel section 120 to the indexing units 130 causes the 3D characterization, representation and/or orientation of the half barrel section 120 relative the position of the half barrel section 120 OML 122 and/or IML 128 relative to the NDI station 140 to be known.

In one embodiment, indexing is performed at least according to the following description. A structure in the form of a half barrel section 120 is carried upon a track 110 comprising a rail 111 embedded within or attached to the floor 108. The rails 111 are positioned in locations relative to the indexing unit 130 and NDI station 140 and/or work station 99. The half barrel section 120 has been fabricated on a layup mandrel 622 (FIG. 6) according to precise dimensions, and this precise layup enables indexing features 124 to be precisely located in a manufacturing excess 129 of the half barrel section 120. Rough trimming of the half barrel section 120 occurs upon layup mandrel 622. The manufacturing excess 129 is partially trimmed off to establish a bearing edge 119. Thus, once the bearing edge 119 of the half barrel section 120 is located on the precisely located rails 111, the half barrel section 120 micro pulses 149 through NDI station 140 and/or work station 99. The 3D characterization, representation and/or orientation of the half barrel section 120 is precisely known when the indexing feature 124 is engaged, without the need for a full scan via probes or optical technology at each micro pulse 149 through NDI station 140 and/or work station 99. In further embodiments, NDI inspection is utilized as an initial station during the processing of the half barrel section 120 in order to perform an initial baseline scan during micro pulses 149 or during pauses between micro pulses 149 or both, or during continuous motion. This baseline scan is used during later processing of the half barrel section 120 and is conveyed during subsequent indexing to work stations 99.

The relative stiffness of the de-molded or otherwise formed half barrel section 120 is relied upon to help the half barrel section 120 maintain a desired EVIL 128 and/or OML 122 along with the precisely located railing 111 and precisely located bearing edge 119 to micro pulse 149 the half barrel section 120 without the need for any substantial shape defining tooling during micro pulsed 149 assembly. In this arrangement, the index features 124 are located precisely into the half barrel section 120 relative to the EVIL 128 and/or OML 122 and the precisely located rails 111 help convey the half barrel section 120 beyond NDI station 140 in process direction 199 through work station 99 without distortion. Therefore, a 3D characterization, representation and/or orientation of the half barrel section 120 within purview 113, 113-1 including OML 122 and/or IML 128 is known by NDI station 140 and/or work station 99 quickly and precisely. This information is conveyed via indexing through controller 160 after each micro pulse 149 without the need to re-scan the purview 113, 113-1 of half barrel section 120 each time. In this manner, the 3D characterization, representation and/or orientation of the OML 122 and/or IML 128 of the half barrel section 120 at a specific portion within the purview 113, 113-1 of an NDI station 140 and/or work station 99 is quickly conveyed to that particular station.

Because of the precise indexing performed, the tools at NDI station 140 and each work station 99 can be located relative to the OML 122 and/or EVIL 128 of the half barrel section 120 as desired when the half barrel section 120 is micro pulsed 149 into place. Quick positioning the tools and technicians within the NDI station 140 and work station 99 relative to the OML 122 and/or IML 128 during the pause between micro pulses 149 increases the throughput and efficiency. The 3D characterization, representation and/or orientation of the half barrel section 120 OML 122 and/or IML 128 of the half barrel section 120 within purview 113, 113-1 is then established or indexed into any Numerical Control (NC) programming or automated system in use at the NDI station 140 and/or work station 99. Therefore, no setup time in the form of scanning is needed after each micro pulse 149 that exposes a purview 113, 113-1 of the half barrel section 120 within the NDI station 140 or work station 99. Similarly, no setup time is needed to bring tooling and technicians to the purview 113, 113-1 of the half barrel section 120 within the NDI station 140 or work station 99 during the micro pulse 149 or the pause between micro pulses 149 or both. In some embodiments, multiple serially arranged NDI stations 140 and/or work stations 99 perform work upon the half barrel section 120 during the same pause between micro pulses 149. In one embodiment, the first of the serially arranged stations is an NDI station 140. Furthermore, structure added to or removed from the half barrel section 120 in the prior work station 99 may be added to the half barrel section 120 electronic model or representation within the system and conveyed via indexing, without the need to scan the half barrel section 120 for the changes after and/or during micro pulse 149.

That is, the indexing of a half barrel section 120 may be performed by aligning the indexing feature 124 to the indexing unit 130. The NDI station 140 has a known positional relationship with the indexing unit 130. When the two are in a known relationship, the NDI head 150 positioned within NDI station 140 is inherently indexed to the half barrel section 120, because the NDI head 150 is already at a known relationship to the NDI station 140. Thus, indexing a half barrel section 120 includes mating an index feature 124 at the half barrel section 120 with a complementary feature 134 at an indexing unit 130 having a known physical offset from the NDI station 140, such that the mating instantly results in the half barrel section 120 OML 122 and IML 128 having a known location relative to the NDI station 140. This relationship is because the complementary features 134 at the indexing unit 130 are pre-located and sized to fit while the half barrel section 120 is at a specific and precisely determined location. In further embodiments, the indexing units 130 comprise cameras, lasers, acoustic sensors, or other components that index the half barrel section 120 without physical coupling with the indexing feature 124 of half barrel section 120.

In still further embodiments, tracking is performed by scanning RFID tags 124-1 that are mounted upon the manufacturing excess 129, 135 of half barrel section 120 and are read as part of indexing a purview 113, 113-1 of the half barrel section 120 within the particular NDI station 140 and/or work station 99. The RFID tag 124-1 are indexing features 124 and are serially located but need not be linearly aligned upon a manufacturing excess 129 of the half barrel section 120. In one embodiment, each RFID tag 124-1 used as indexing feature 124 aligns with each of multiple serially located NDI station 140 and/or work station 99 and communicate specifics of the 3D characterization, representation and/or orientation of the half barrel section 120 as well as instructions for work to be performed at the NDI station 140 and/or work station 99. The NDI station 140 and/or work station 99 work on purviews 113, 113-1 of half barrel section 120 followed by a different half barrel section 120 followed by a different half barrel section 120 and of the same model of aircraft or a different model of aircraft, or a different section of the same model as the first two sections, as desired. The RFID tag 124-1 explains to the station what, if any, work shall be completed on the particular section being pulsed through NDI station 140 or work station 99. NDI station 140 includes one or more NDI heads 150, 150-1. The NDI heads 150, 150-1 characterize internal inconsistencies 430 (FIG. 4) of a cross-section of each half barrel section 120 progressing along the track 110, and are mounted (e.g., fixedly or movably) to a frame 159, 159-1. Frame 159 is located in concavity 126 and has a shape complementary to IML 128 as half barrel section 120 micro pulses 149 through NDI station 140 and above frame 159. Frame 159-1 has a shape complementary to OML 122 as half barrel section 120 micro pulses 149 through NDI station 140 and under frame 159-1. The NDI heads 150, 150-1 characterize internal inconsistencies 430 of a cross-section of each of a series of half barrel sections 120 of uniform or non-uniform shape that advance along a track past the NDI station 140. Internal inconsistencies 430 comprise voids, foreign object debris, resin rich areas, resin starved areas and etc.

In one embodiment, the NDI heads 150, 150-1 are arranged in array 157 and array 157-1 that is disposed along frame 159 and frame 159-1, respectively. In one embodiment, each NDI head 150, 150-1 is capable of moving in an arcuate fashion along frame 159, 159-1 and within purview 113 relative to the half barrel section 120. The motion of the NDI heads 150, 150-1 are synchronized to prevent collisions. For example, the NDI heads 150, 150-1 may move clockwise, then counterclockwise synchronously within purview 113 complementary to the half barrel section 120 while the half barrel section 120 is in a micro pulse 149 or paused between micro pulses 149 and/or both. In a further embodiment, the NDI heads 150, 150-1 are arranged in an array 157, 157-1. In a further embodiment, the movement of the NDI heads 150, 150-1 relative to the half barrel section 120 is provided by the motion of the half barrel section 120 along the assembly line 100. The NDI station 140 scans are performed on the half barrel section 120 that is within the purview 113 of the NDI heads 150, 150-1 during a micro pulse 149 or pause between micro pulses 149. The entire NDI scan is therefore a sum of the one or more scans acquired while within purview 113 of the half barrel section 120 regardless of whether the motion relative to half barrel section 120 is a full pulse 118, micro pulse 149, or continuous or NDI heads 150 relative to half barrel section 120. Images acquired from the NDI heads 150, 150-1 are overlapped to create an image of a cross-section 321 of the half barrel section 120 at once. The specific implementation and timing of scans may vary depending on the number of NDI heads 150, 150-1, the takt time within NDI station 140 and work station 99 and whether or not the half barrel section 120 is advanced in a full pulse 118, micro pulse 149 or moved continuously.

Depending on the implementation, the NDI station 140 may form an inner frame 159 that follows the IML 128 of the half barrel section 120 or may form an outer frame 159-1 that follows the OML 122 of the half barrel section 120. In such embodiments, pulse-echo inspection is utilized to scan for internal inconsistencies 430, particularly out-of-tolerance conditions within the half barrel section 120. In further embodiments, the NDI station 140 has a pair of frames 159, 159-1, one inside of the EVIL 128 of the half barrel section 120, and one outside of the OML 122 of the half barrel section 120. In one embodiment, one frame 159, 159-1 is dedicated to ultrasonic transducers that transmit ultrasonic energy, and another frame 159, 159-1 is dedicated to ultrasonic transducers that receive ultrasonic energy, and scans are performed in a through-transmission mode.

In this embodiment, the NDI heads 150, 150-1 comprise ultrasonic sensors. Each NDI head 150, 150-1 includes a feed line 152, 152-1 that supplies liquid (e.g., water) to the NDI head 150, 150-1. Each NDI head 150, 150-1 also includes an ultrasonic transducer 154, 154-1. Liquid from the feed line 152, 152-1 travels into chamber 156, 156-1 which is defined by the structure of the NDI head 150, 150-1 as well as the surface 323, 323-1 (FIG. 3A) being scanned. This forms a pathway for ultrasonic energy to travel from the ultrasonic transducer 154, 154-1 into the half barrel section 120. A flexible face 155, 155-1 holds the NDI head 150, 150-1 against the half barrel section 120, which ensures the existence of an effective ultrasonic pathway while also limiting loss of liquid from the chamber 156, 156-1. An adjustable connection 158, 158-1, such as a bellows, spring-arm, or kinematic chain (actuatable robot arm) enables deflection of the NDI heads 150, 150-1 in response to changes in the contour 322, 322-1 (FIG. 3A) of the half barrel section 120. The flexible face 155, 155-1 thus elastically deflects in response to the changes to the contour 322, 322-1 of the half barrel section 120. Adjustable connection 158, 158-1 includes a universal type joint fitting that facilitates deflection of the NDI head 150, 150-1. Adjustable connection 158, 158-1 permits the NDI head 150, 150-1 to traverse the frame 159, 159-1 to facilitate scanning. One side of the adjustable connection 158 is between the NDI head 150, 150-1 and the frame 159, 159-1, such as a biased or automated connection, and provides a flexibility that facilitates NDI head 150, 150-1 deflection relative to frame 159, 159-1. The other side of the adjustable connection 158-1, such as bellows, is between the NDI head 150, 150-1 and half barrel section 120 and provides a chamber 156, 156-1 flexibility between NDI head 150, 150-1 and half barrel section 120. This enables the NDI heads 150, 150-1 to engage in contour 322, 322-1 following, as the last side of the chamber 156, 156-1 is the surface being inspected. In one embodiment, the adjustable connection 158 comprises a kinematic chain that operates in accordance with instructions in a Numerical Control (NC) program to advance the NDI head 150, 150-1 along a contour 322, 322-1 of the half barrel section 120 being scanned in an arc along the frame 159, 159-1 and/or lengthwise direction 198 to cover purview 113. The adjustable connection 158, 158-1 helps to keep the NDI head 150, 150-1 in contact with the half barrel section 120 as the half barrel section 120 proceeds in the process direction 199, and/or as the NDI heads 150 move along frame 159, 159-1 across the half barrel section 120.

In one embodiment, NDI station 140 comprises one of multiple stations that are disposed along the track 110 and are separated by less than the length of the half barrel section 120. Work performed by work stations 99 may comprise installing new parts onto the half barrel section 120 via fasteners, removing material (e.g., drilling or trimming), adding material, etc. In one embodiment, each of the work stations 99 performs a type of work such as installing new parts like frames, stringers, door surrounds, window surrounds, intercostals, cutting door openings, or cutting window openings. As a part of the installation process, these various components being installed may be located and indexed with respect to the half barrel section 120. For example, cup-and-cone indexing systems may be utilized to place a part onto a half barrel section 120, and hard-stop indexing may be utilized to index a half barrel section 120 to work station 99.

Figure 1B:
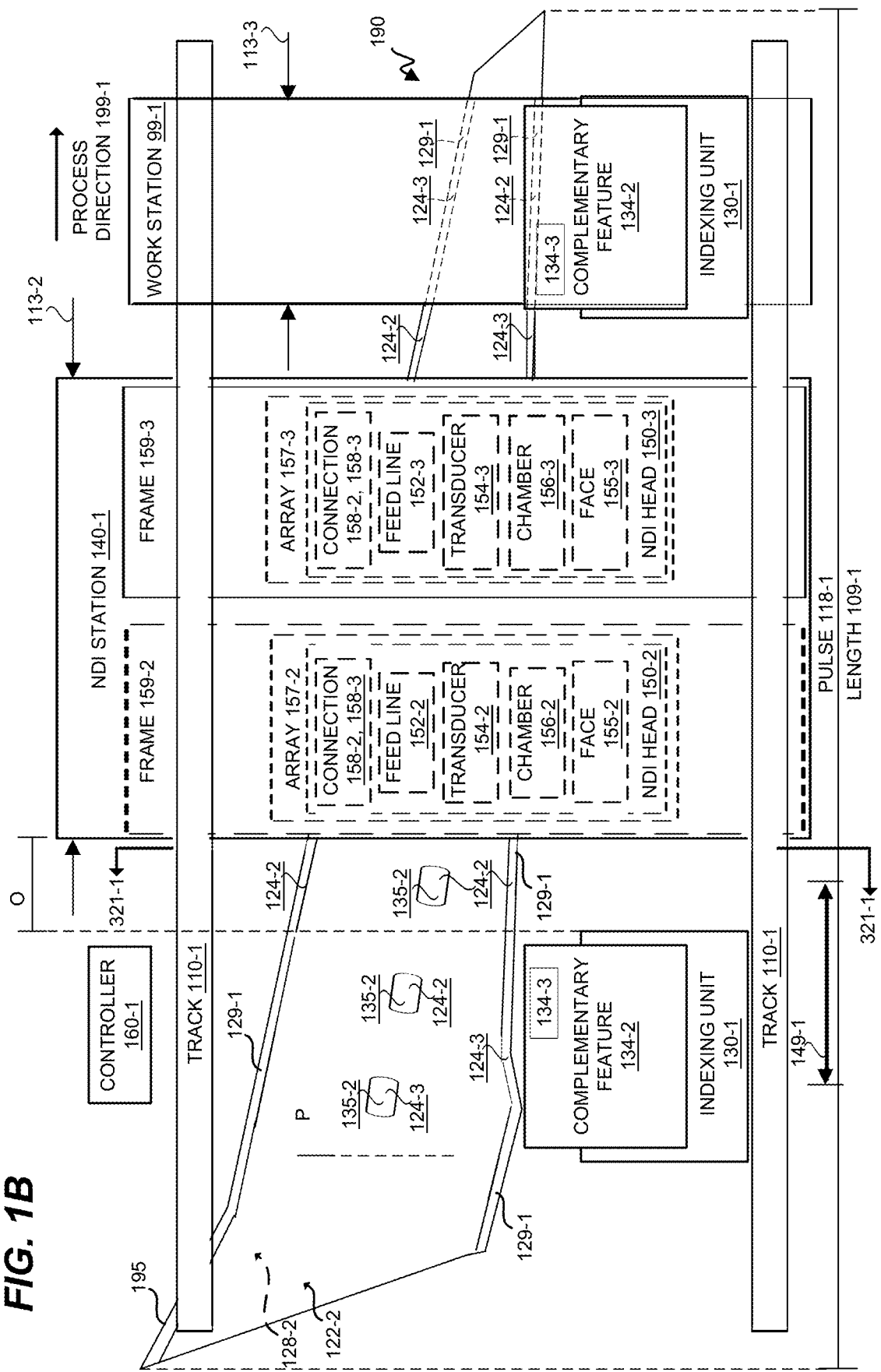

FIG. 1B is a block diagram of an assembly line 190 that includes an NDI station 140-1 for wing panels 195 of airframes that are being fabricated in an illustrative embodiment. Assembly line 190 includes similar components to that of assembly line 100, with the exception that the systems and components are designed to operate upon wing panel 195 having embedded index features 124-2 instead of operating upon a section of fuselage. Similarly, a system of this type adapted to a particular structure could also be used on other composite structures such as stabilizers, floor beams, frames, spars, flap components, slats, door components, etc.

The wing panel 195 is shown with a length 109-1 which is not illustrated to actual scale. Likewise, wing panel 195 is shown with a manufacturing excess 129-1 along the edges and in the manufacturing excess 135-2. Similarly, wing panel 195 is shown in relation to NDI station 140-1 and work station 99-1 and micro pulse 149-1 which are not illustrated to actual scale. Another manufacturing excess 135-2 is the material removed to form the wing access panels which are typically on the lower wing panel. In some embodiments, the wing panel 195 comprises a hardened composite part. The wing panel 195 includes an Outer Mold Line (OML) 122-2 and Inner Mold Line (IML) 128-2.

In this embodiment, assembly line 190 comprises track 110-1, upon which the wing panel 195 is moved in a process direction 199-1. The track 110-1 conveys one or more strongbacks, not shown, which couple the wing panel 195 to the tracks 110-1. The track 110-1 facilitate motion (e.g., rolling or sliding) of the wing panel 195. In further embodiments, the track 110-1 includes a chain drive, motorized cart, or other powered system that is capable of moving the wing panel 195 in the process direction 199-1.

Assembly line 190 further comprises indexing units 130-1. Each indexing unit 130-1 is designed to physically couple with an index feature 124-2, such as a machined feature such as a hole or slot and/or an added feature such as a pin in the wing panel 195. The index features 124-2 are placed at locations within manufacturing excess 129-1, 135-2 along the wing panel 195. In one embodiment, each of the index features 124-2 is separated by a distance such as micro pulse 149-1 or a fraction or multiple thereof along the wing panel 195. In an embodiment, each of the index features 124-2 is separated by the different distances along the wing panel 195. In further embodiments, the index features 124-2 are disposed in a manufacturing excess 129-1, 135-2 of the wing panel 195, which is trimmed away prior to the wing panel 195 entering service.

In further embodiments, tracking with Radio Frequency Identifier (RFID) is used for indexing. The RFID tag 124-3 is located in the manufacturing excess 129-1, 135-2 as part of an index feature 124-2. The RFID scanner 134-3 is part of complementary feature 134-2. The RFID tag 124-3 is mounted singularly or along with other index feature 124-2 in locations optimal to conveying indexing information to NDI station 140-1. The RFID scanner 134-3 is mounted singularly or along with other complementary features 134-2 in locations optimal for communicating with index feature 124-2 including RFID tag 124-3 to conveying indexing information to NDI station 140-1. The indexing conveys information to NDI station 140-1 about wing panel 195 within the purview 113-2 of NDI station 140-1. In such an embodiment, the RFID tag 124-3 themselves are used as the index features 124-2, and are serially located, (e.g., linearly aligned or non-linearly aligned) upon the manufacturing excess 129-1, 135-2 of the wing panel 195. The index feature 124-2 including RFID tags 124-3 align with the complementary features 134-2 located relative to NDI station 140-1 and work station 99-1. The index feature 124-2 including RFID tags 124-3 communicate specifics of desired 3D characterization, representation and/or orientation of EVIL 128-1 and OML 122-1 for the wing panel 195 via indexing unit to controller 160-1. The operations of the track 110-1, NDI station 140-1, work station 99-1 and/or other components are managed by controller 160-1. In some embodiments, these index features 124-2, including RFID tags 124-3, also include instructions for work to be performed by the NDI station 140-1 and work station 99-1. For example, in an embodiment where NDI stations 140-1 and/or work station 99-1 perform work on purviews 113-2, 113-3 of a wing panel 195 at the same time. An embodiment has a lower wing panel 195-1 followed by an upper wing panel 195-2 (see FIG. 1) progressing serially down assembly line 190. Another embodiment has the wing panel 195 one model followed the wing panel 195 of a different model. The index feature 124-2 on each wing panel 195 communicates to the NDI station 140-1 and/or work station 99-1 what, if any, work needs to be completed on the particular wing panel 195 within purview 113-2, 113-3 as it pauses between micro pulses 149-1 or during micro pulses 149-1 through NDI station 140-1 and/or work station 99-1. The index feature 124-2 also communicates the OML 122-1 and IML 128-1 information during indexing.

In one embodiment, controller 160-1 determines a progress of the wing panel 195 along the track 110-1 based on indexing, input from a technician or artificial intelligence in accordance with an automated process such as input from a camera or physical sensor, such as a linear or rotary actuator. Work is performed on wing panel 195 purview 113-2, 113-3 in NDI station 140-1 and/or work station 99-1, respectively, based upon index conveyed information to NDI station 140-1 and/or work station 99-1. Then controller 160-1 instructs the NDI station 140-1 and/or work station 99-1. The controller 160-1 uses this input to manage the operations wing panel 195 purview 113-2, 113-3 in NDI station 140-1 and/or work station 99-1 in accordance with instructions stored in a Numerical Control (NC) program. Controller 160-1 may be implemented, for example, as custom circuitry, as a hardware processor executing programmed instructions, or some combination thereof.

In this embodiment, each of the indexing units 130-1 includes a complementary feature 134-2 for insertion into, grasping, or otherwise fitting with an index feature 124-2. Complementary feature 134-2 for insertion into, grasping, or otherwise fitting with an index feature 124-2 provides a hard stop at the end of a micro pulse 149-1. Indexing units 130-1 are placed at locations relative to the NDI station 140-1 and/or work stations 99-1 and track 110-1.

Indexing units 130-1 are fixed relative to NDI station 140-1 and/or work station 99-1 for embodiment hard stops at the ends of micro pulse 149-1. Indexing units 130-1 are not fixed relative to NDI station 140-1 and/or work station 99-1 for indexing during micro pulse 149-1 or continuous assembly. An embodiment has wing panel 195 micro pulse 149-1 a distance at least equal to the shortest distance between index features 124-2 and indexed to the indexing units 130-1 and worked upon by the NDI station 140-1. That is, the wing panel 195 is indexed as part of a micro pulse 149-1 or continuous system. Whenever the index features 124-2 in the wing panel 195 and the complementary features 134-2 in the indexing units 130-1 are mated, the location of the wing panel 195 is indexed to a known location and the 3D characterization, representation and/or orientation of the wing panel 195 relative to the track 110-1, the indexing units 130-1, and the NDI station 140-1 and/or work station 99-1 is known. Specifically, and embodiment has each indexing unit 130-1 disposed at a known offset (O) (e.g., along three axes) from the NDI station 140-1 and/or work station 99-1, meaning that the act of indexing a wing panel 195 to the indexing units 130-1 causes the position of the wing panel 195 OML 122-1 and/or IML 128-1 relative to the NDI station 140-1 to be known. This embodiment is illustrated with indexing unit 130-1 offset (O) from NDI Station 140-1. Another embodiment has each indexing unit 130-1 disposed without offset (O) from the NDI station 140-1 and/or work station 99-1. This embodiment is illustrated with indexing unit 130-1 at work station 99-1. With or without the offset (O) relative to NDI station 140-1 and/or work station 99-1, indexing a wing panel 195 to the indexing units 130-1 causes the 3D characterization, representation and/or orientation of the wing panel 195 relative the position of the wing panel 195 OML 122-1 and/or EVIL 128-1 relative to the NDI station 140-1 to be known.

In one embodiment, indexing is performed at least according to the following description. The wing panel 195 is carried by a strongback (not shown) upon a track 110-1. The wing panel 195 have been fabricated on a layup mandrel 622 (FIG. 6) according to precise dimensions, and this precise layup enables index features 124-2 to be precisely located in a manufacturing excess 129-1 of the wing panel 195. Rough trimming of the wing panel 195 occurs upon layup mandrel 622. The 3D characterization, representation and/or orientation of the wing panel 195 is precisely known when the index feature 124-2 is engaged, without the need for a full scan via probes or optical technology at each micro pulse 149-1 through NDI station 140-1 and/or work station 99-1. In further embodiments, NDI inspection is utilized as an initial station during the processing of the wing panel 195 in order to perform an initial baseline scan during a micro pulse 149-1 or during pauses between micro pulses 149-1 or both, or during continuous motion. This baseline scan is used during later processing of the half barrel section 120 and is conveyed during subsequent indexing to work stations 99-1.

The relative stiffness of the de-molded is relied upon to help the wing panel 195 maintain a desired IML 128-1 and/or OML 122-1. In this arrangement, the index features 124-2 are located precisely into the wing panel 195 relative to the EVIL 128-1 and/or OML 122-1 and the precisely located rails 111 help convey the wing panel 195 beyond NDI station 140-1 in process direction 199-1 through work station 99-1 without distortion. Therefore, a 3D characterization, representation and/or orientation of the wing panel 195 within purview 113-2, 113-3 including OML 122-1 and/or IML 128-1 is known by NDI station 140-1 and/or work station 99-1 quickly and precisely. This information is conveyed via indexing through controller 160-1 after each micro pulse 149-1 without the need to re-scan the purview 113-2, 113-3 of wing panel 195 each time. In this manner, the 3D characterization, representation and/or orientation of the wing panel 195 OML 122-1 and/or IML 128-1 at a specific portion within the purview 113-2, 113-3 of an NDI station 140-1 and/or work station 99-1 is quickly conveyed to that particular station.

Because of the precise indexing performed, the tools at NDI station 140-1 and each work station 99-1 can be located relative to the OML 122-1 and/or IML 128-1 of the wing panel 195 as desired when the wing panel 195 is micro pulsed 149-1 into place. Quick positioning of the tools and technicians within the NDI station 140-1 and work station 99-1 relative to the OML 122-1 and/or IML 128-1 during the pause between micro pulses 149-1 increases the throughput and efficiency. The 3D characterization, representation and/or orientation of the wing panel 195 OML 122-1 and/or EVIL 128-1 of the wing panel 195 within purview 113-2, 113-3 is then established or indexed into any Numerical Control (NC) programming or automated system in use at the NDI station 140-1 and/or work station 99-1. Therefore, no setup time in the form of scanning is needed after each micro pulse 149-1 that exposes a purview 113-2, 113-3 of the wing panel 195 within the NDI station 140-1 or work station 99-1. Similarly, no setup time is needed to bring tooling and technicians to the purview 113-2, 113-3 of the wing panel 195 within the NDI station 140-1 or work station 99-1 during the micro pulse 149-1 or the pause between micro pulses 149-1 or both. In some embodiments, multiple serially arranged NDI stations 140-1 and/or work stations 99-1 perform work upon the wing panel 195 during the same pause between micro pulses 149-1. In one embodiment, the first of the serially arranged stations is an NDI station 140-1. Furthermore, structure added to or removed from the wing panel 195 in the prior work station 99-1 may be added to the wing panel 195 electronic model or representation within the system and conveyed via indexing, without the need to scan the wing panel 195 for the changes after and/or during micro pulse 149-1.

That is, the indexing of a wing panel 195 may be performed by aligning the index feature 124-2 to the indexing unit 130-1. The NDI station 140-1 has a known positional relationship with the indexing unit 130-1. When the two are in a known relationship, the NDI heads 150-2, 150-3 are positioned within NDI station 140-1 are inherently indexed to the wing panel 195, because the NDI heads 150-2, 150-3 are already at a known relationship to the NDI station 140-1. Thus, indexing a wing panel 195 includes mating an index feature 124-2 at the wing panel 195 with a complementary feature 134-2 at an indexing unit 130-1 having a known physical offset from the NDI station 140-1, such that the mating instantly results in the wing panel 195 OML 122-1 and EVIL 128-1 having a known location relative to the NDI station 140-1. This is because the complementary features 134-2 at the indexing unit 130-1 are pre-located and sized to fit while the wing panel 195 is at a specific and precisely determined location. In further embodiments, the indexing units 130-1 comprise cameras, lasers, acoustic sensors, or other components that index the wing panel 195 without physical coupling with the index feature 124-2 of wing panel 195.

In still further embodiments, tracking is performed by scanning RFID tags 124-3 that are mounted upon the manufacturing excess 129-1, 135-2 of wing panel 195 and are read as part of indexing a purview 113-2, 113-3 of the wing panel 195 within the particular NDI station 140-1 and/or work station 99-1. The RFID tag 124-3 are index features 124-2 and are serially located but need not be linearly aligned upon a manufacturing excess 129-1 of the wing panel 195. In one embodiment, each RFID tag 124-3 used as index feature 124-2 aligns with each of multiple serially located NDI station 140-1 and/or work station 99-1 and communicate specifics of the 3D characterization, representation and/or orientation of the wing panel 195 OML 122-1 and/or IML 128-1 as well as instructions for work to be performed at the NDI station 140-1 and/or work station 99-1. The NDI station 140-1 and/or work station 99-1 work on purviews 113-2, 113-3 of wing panel 195 followed by a different wing panel 195 followed by a different wing panel 195 and of the same model of aircraft or a different model of aircraft, or a different wing panel 195 of the same model as the first two sections, as desired. The RFID tag 124-3 explains to the station what, if any, work shall be completed on the particular wing panel 195 being pulsed through NDI station 140-1 or work station 99-1. NDI station 140-1 includes one or more NDI heads 150-2, 150-3. The NDI heads 150-2, 150-3 characterize internal inconsistencies 430 (FIG. 4) of a cross-section of each wing panel 195 progressing along the track 110-1, and are mounted (e.g., fixedly or movably) to a frame 159-2, 159-3. Frame 159-2 is located on the lower side of wing panel 195 and has a shape complementary to EVIL 128-2 as wing panel 195 micro pulses 149-1 through NDI station 140-1 and above frame 159-2. Frame 159-3 has a shape complementary to OML 122-2 as wing panel 195 micro pulses 149-1 through NDI station 140-1 and under frame 159-3. The NDI heads 150-2, 150-3 characterize internal inconsistencies 430 of a wing panel 195 that advance along a track 110-1 past the NDI station 140-1. Internal inconsistencies 430 comprise voids, foreign object debris, resin rich areas, resin starved areas and etc.

In one embodiment, the NDI heads 150-2, 150-3 are arranged in array 157-2 and array 157-3 that is disposed along frame 159-2 and frame 159-3, respectively. In one embodiment, each NDI head 150-2, 150-3 is capable of moving in an arcuate fashion along frame 159-2, 159-3 and within purview 113-2 relative to the wing panel 195. The motion of the NDI heads 150-2, 150-3 are synchronized to prevent collisions. For example, the NDI heads 150-2, 150-3 may move clockwise, then counterclockwise synchronously within purview 113-2 complementary to the wing panel 195 while the wing panel 195 is in a micro pulse 149-1 or paused between micro pulses 149-1 and/or both. In a further embodiment, the NDI heads 150-2, 150-3 are arranged in an array 157-2, 157-3. In a further embodiment, the movement of the NDI heads 150-2, 150-3 relative to the wing panel 195 is provided by the motion of the wing panel 195 along the assembly line 190. The NDI station 140-1 scans are performed on the wing panel 195 that is within the purview 113-2 of the NDI heads 150-2, 150-3 during a micro pulse 149-1 or pause between micro pulses 149-1. The entire NDI scan is therefore a sum of the one or more scans acquired while within purview 113-2 of the wing panel 195 regardless of whether the motion relative to wing panel 195 is advanced by a full pulse 118, micro pulse 149-1, or continuous or NDI heads 150-2, 150-3 relative to wing panel 195. Images acquired from the NDI heads 150-2, 150-3 are overlapped to create an image of a cross-section of the wing panel 195 at once. The specific implementation and timing of scans may vary depending on the number of NDI heads 150-2, 150-3, the takt time within NDI station 140-1 and work station 99-1 and whether or not the wing panel 195 is advanced by a full pulse 118-1, micro pulsed 149-1 or moved continuously.

Depending on the implementation, the NDI station 140-1 has an inner frame 159-2 that follows the EVIL 128-1 of the wing panel 195 or may form an outer frame 159-3 that follows the OML 122-1 of the wing panel 195. In such embodiments, pulse-echo inspection are utilized to scan for internal inconsistencies 430, particularly out-of-tolerance conditions within the wing panel 195. In further embodiments, the NDI station 140-1 has a pair of frames 159, 159-1, one inside of the IML 128-1 of the wing panel 195, and one outside of the OML 122-1 of the wing panel 195. In one embodiment, one frame 159-2, 159-3 is dedicated to ultrasonic transducers that transmit ultrasonic energy, and another frame 159-2, 159-3 is dedicated to ultrasonic transducers that receive ultrasonic energy, and scans are performed in a through-transmission mode.

In this embodiment, the NDI heads 150-2, 150-3 comprise ultrasonic sensors. Each NDI head 150-2, 150-3 includes a feed line 152-2, 152-3 that supplies liquid (e.g., water) to the NDI head 150-2, 150-3. Each NDI head 150-2, 150-3 also includes an ultrasonic transducer 154-2, 154-3. Liquid from the feed line 152-2, 152-3 travels into chamber 156-2, 156-3 which is defined by the structure of the NDI head 150-2, 150-3 as well as the IML 128-2 or OML 122-2 being scanned. This forms a pathway for ultrasonic energy to travel from the ultrasonic transducer 154-2, 154-3 into the wing panel 195. A flexible face 155-2, 155-3 holds the NDI head 150-2, 150-3 against the wing panel 195, which ensures the existence of an effective ultrasonic pathway while also limiting loss of liquid from the chamber 156-2, 156-3. An adjustable connection 158-2, 158-3, such as a bellows, spring-arm, or kinematic chain (actuatable robot arm) enables deflection of the NDI heads 150-2, 150-3 in response to changes in the IML 128-2 or OML 122-2 of the wing panel 195. One side of the adjustable connection 158-2 is between the NDI head 150-2, 150-3 and the frame 159-2, 159-3, such as a biased or automated connection, and provides a flexibility that facilitates NDI head 150-2, 150-3 deflection relative to frame 159-2, 159-3. Adjustable connection 158-2, 158-3 includes a universal type joint fitting that facilitates deflection of the NDI head 150-2, 150-3. Adjustable connection 158-2, 158-3 permits the NDI head 150-2, 150-3 to traverse the frame 159-2, 159-3 to facilitate scanning. The other side of the adjustable connection 158-1, such as bellows, is between the NDI head 150-2, 150-3 and wing panel 195 and provides a chamber 156-2, 156-3 between NDI head 150-2, 150-3 and wing panel 195. This enables the NDI heads 150, 150-1 to engage in contour 322, 322-1 following, as the last side of the chamber 156-2, 156-3 is the surface being inspected. In one embodiment, the adjustable connection 158-2, 158-3 comprises a kinematic chain that operates in accordance with instructions in a Numerical Control (NC) program to advance the NDI head 150-2, 150-3 along IML 128-2 or OML 122-2 of the wing panel 195 being scanned in an arc along the frame 159-2, 159-3 and/or lengthwise direction 198 to cover purview 113-2. The adjustable connection 158-2, 158-3 helps to keep the NDI head 150-2, 150-3 in contact with the wing panel 195 as the wing panel 195 proceeds in the process direction 199-1, and/or as the NDI heads 150-2, 150-3 move along frame 159-2, 159-3 across the wing panel 195.

In one embodiment, NDI station 140-1 comprises one of multiple stations that are disposed along the track 110-1 and are separated by less than the length of the wing panel 195. Work performed by work stations 99-1 may comprise installing new parts onto the wing panel 195 via fasteners, removing material (e.g., drilling or trimming), adding material, etc. In one embodiment, each of the work stations 99-1 performs a type of work such as installing new parts like ribs, stringers, spars, cutting access door openings or etc. As a part of the installation process, these various components being installed may be located and indexed with respect to the wing panel 195. For example, cup-and-cone indexing systems may be utilized to place a part onto a wing panel 195, and hard-stop indexing may be utilized to index a wing panel 195 to work station 99-1.

Illustrative details of the operation of assembly line 100 will be discussed with regard to FIG. 2. Assume, for this embodiment, that one or more of the half barrel sections 120 or wing panels 195 have been placed in sequence onto the track 110, 110-1, respectively, and are ready for NDI scanning to detect internal inconsistencies 430.

FIG. 2 is a flowchart illustrating a method for operating a assembly line to inspect sections of fuselage in an illustrative embodiment. The steps of method 200 are described with reference to assembly line 100 of FIG. 1A, but those skilled in the art will appreciate that method 200 may be performed in other systems. The steps of the flowcharts described herein are not all inclusive and may include other steps not shown. The steps described herein may also be performed in an alternative order. Furthermore, although the steps herein are described for half barrel sections 120, they may be applied to any suitable arcuate sections of fuselage, such as full barrel sections, one-quarter barrel sections, or other segment sizes or wing panels 195, flaps, horizontal stabilizers or vertical stabilizers.

Step 202 comprises advancing half barrel section 120 or wing panels 195 along a track 110, 110-1 in a process direction 199, 199-1 through NDI station 140, 140-1, and work station 99, 99-1, respectively that perform work on the structure. In one embodiment, the half barrel section 120 is advanced along the track 110 in a process direction 199 by a full pulse 118, micro pulse 149 of the half barrel section 120. In another embodiment, the wing panel 195 is pulsed along the track 110-1 in a process direction 199-1 by micro pulse 149-1 of the wing panel 195, or for its entire length 109-1. Pulsing the half barrel section 120 or wing panel 195 incrementally exposes the half barrel section 120 or wing panel 195 to purview 113, 113-1 for inspection by the NDI station 140. As purview 113, 113-1 has a length less than length 109, 109-1, micro pulse 149, pulse or continuous exposes new sections of the half barrel section 120 or wing panel 195 to the purview 113, 113-1 of the NDI station 140. The distance traveled in a micro pulse 149 may equal, for example, a frame pitch 147 or rib pitch on the half barrel section 120 or wing panel 195, respectively. Pulses equal to or greater than 109, 109-1 are referred to as a pulse. Continuous advancement without pauses are also possible. In embodiments where the track 110, 110-1 is powered, this comprises driving one or more elements of the track 110, 110-1 to move the half barrel section 120 or wing panel 195 in the process direction 199, 199-1, respectively. In further embodiments, this comprises operating an Autonomous Guided Vehicle (AGV), or operating a powered cart mounted to the track 110, 110-1 in order to pulse, micro pulse 149 the half barrel section 120 or wing panel 195 to a desired location along the track 110, 110-1. In embodiments where additional sections of fuselage are disposed on the track 110, the additional sections are also advanced by full pulse 118, micro pulse 149, in synchronization with the pulsing of the half barrel section 120 depicted in FIG. 1A. In still further embodiments, the structure advances continuously. Advance a structure, such as half barrel section 120 or wing panel 195, along a track 110, 110-1 in process direction 199, 199-1 through NDI station 140, 140-1 thereby exposing the structure incrementally to its purview 113, 113-1, respectively.

Step 204 includes indexing the structure, such as half barrel section 120 or wing panel 195, to a NDI station 140, 140-1 that is disposed relative to the track 110, 110-1. In one embodiment, this comprises mating the index features 124, 124-1, 124-2, 124-3 in the half barrel section 120 or wing panel 195 to complementary features 134, 134-1, 134-2, 134-3 that are located relative to the track 110, 110-1 at known offsets from the NDI station 140, 140-1. For example, complementary features 134, 134-2 such as pins disposed at the track 110, 110-1 may be inserted into index features 124, 124-2 such as holes that have been machined into a manufacturing excess 129, 129-1, 135, 135-2 of the half barrel section 120 or wing panel 195, respectively, at predefined intervals. RFID tag 124-1, 124-3 may be applied to the manufacturing excess 129, 129-1, 135, 135-2 at desired locations. In further embodiments, any suitable indexing techniques and systems may be utilized to arrange the half barrel section 120 or wing panel 195 in a desired relationship with an NDI station 140, 140-1. After the half barrel section 120 has been indexed, the location of the 3D characterization, representation and/or orientation of EVIL 128 and OML 122 for the half barrel section 120 relative to the NDI station 140 is known. Likewise, after the wing panel 195 has been indexed, the location of the 3D characterization, representation and/or orientation of IML 128-2 and OML 122-2 for the wing panel 195 relative to the NDI station 140-1 is known. Hence, work can be performed at a desired level of accuracy and precision even for very large structures. In embodiments where multiple half barrel sections 120 or wing panel 195 travel along the track 110, 110-1 at once, respectively, the indexing of the half barrel sections 120 or wing panel 195 may be performed in synchronization. In this manner, multiple portions of half barrel section 120 or wing panel 195 are indexed to multiple stations like NDI station 140, 140-1 and/or work station 99, 99-1 at the end of a full pulse 118 or micro pulse 149, and the multiple stations perform work at the same time upon the portions of the half barrel section 120 or wing panel 195 during the pause. This work can include NDI inspection processes performed upstream of a work station 99, 99-1. In further embodiments, input from lasers, cameras, or other components are utilized to index the structure to the NDI station 140, 140-1 without physically coupling with the structure.

In step 206, the controller 160 operates an NDI head 150, 150-1, 150-2, 150-3 at the NDI station 140, 140-1 to characterize internal inconsistencies 430 of a cross-section 321, 321-1 of the half barrel section 120 or wing panel 195. Operating the NDI head 150, 150-1, 150-2, 150-3 may be performed during pauses between full pulses 118 or pauses between micro pulses 149 of the half barrel section 120 or wing panel 195. Alternatively, the NDI head 150, 150-1, 150-2, 150-3 may continuously scan the structure as the half barrel section 120 or wing panel 195 continuously moves through the NDI station 140, 140-1. Operating the NDI head 150, 150-1, 150-2, 150-3 may comprise operating an array 157, 157-1, 157-2, 157-3 of NDI heads 150, 150-1, 150-2, 150-3 at the NDI station 140, 140-1 that are arranged along a contour 322, 322-1 or IML 128, 128-2 or OML 122, 122-2 of the half barrel section 120 or wing panel 195, respectively. Input from the array 157, 157-1, 157-2, 157-3 of NDI heads 150, 150-1, 150-2, 150-3 is combined to generate an image of the cross-section 321, 321-1. In further embodiments, this step further comprises advancing the NDI head 150, 150-1, 150-2, 150-3 along a contour 322, 322-1 or IML 128, 128-2 or OML 122, 122-2 of the or IML 128-2 or OML 122-2 while scanning with the NDI head 150, 150-1, 150-2, 150-3.

In embodiments where the NDI head 150, 150-1, 150-2, 150-3 is an ultrasonic device, operating the NDI head 150, 150-1, 150-2, 150-3 may comprise transmitting ultrasonic energy through a thickness of the half barrel section 120 or wing panel 195, and determining a delay before receiving reflected ultrasonic energy in order to perform inspection (e.g., pulse-echo inspection) of the half barrel section 120 or wing panel 195, or performing through-transmission inspection via ultrasonic transducers and receivers separated by a thickness of the half barrel section 120 or wing panel 195, respectively. If the internal portions of the half barrel section 120 are uniform, then the reflected ultrasonic energy is expected to take a predetermined amount of time to be received. However, if the reflected ultrasonic energy returns more quickly or slowly than expected, the ultrasonic energy has encountered an internal inconsistency 430. Variations in signal amplitude may also be monitored to detect internal inconsistencies 430. Depending on the amount of delay, the type of inconsistency may be analyzed to determine whether it is part of an out-of-tolerance condition (e.g., a void that is too wide, too long, etc.). In this manner, controller 160 detects out of tolerance conditions based on the internal inconsistencies 430; and reports the out of tolerance conditions for rework.

Steps 202-206 may be iteratively repeated in order to acquire internal images along the entire length 109, 109-1 of the half barrel section 120 or wing panel 195 at a desired resolution (e.g., down to the thousandth or hundredth of an inch) in order to characterize the half barrel section 120 or wing panel 195. That is, advancing the half barrel section 120 or wing panel 195, indexing the half barrel section 120 or wing panel 195, and operating the NDI head 150, 150-1, 150-2, 150-3 are performed iteratively to expose new portions of the half barrel section 120 or wing panel 195 for scanning, and to characterize multiple cross-sections 321, 321-1 of the half barrel section 120 or wing panel 195 along the length 109, 109-1 of the half barrel section 120 or wing panel 195. Movement of the NDI heads 150, 150-1, 150-2, 150-3 relative to the half barrel section 120 or wing panel 195 being scanned can provided by micro pulse 149 motion of the half barrel section 120 or wing panel 195 itself, independent movement of the NDI head 150, 150-1, 150-2, 150-3 or some combination of the two.

In still further embodiments, images from NDI may be compiled to generate a three dimensional (3D) model of the half barrel section 120 or wing panel 195 as-fabricated, based on input from the NDI head 150, 150-1, 150-2, 150-3. The 3D model is then aligned to a 3D model that represents a design of the half barrel section 120 or wing panel 195. If internal inconsistencies 430, particularly out of tolerance inconsistencies, exist between the 3D model of the half barrel section 120 or wing panel 195 as-fabricated and the 3D theoretical model of the design for half barrel section 120 or wing panel 195, these inconsistencies may be reported for review and/or rework. In many embodiments, the NDI station 140, 140-1 processes are placed first in a post-hardening assembly line, in order to enable rapid detection of any out of tolerance internal inconsistencies 430 in the part being fabricated. In such embodiments, a station disposed immediately after NDI station 140, 140-1 may be implemented as a rework station to address such out of tolerance inconsistencies prior to entering work station 99, 99-1.

Figure 3A:
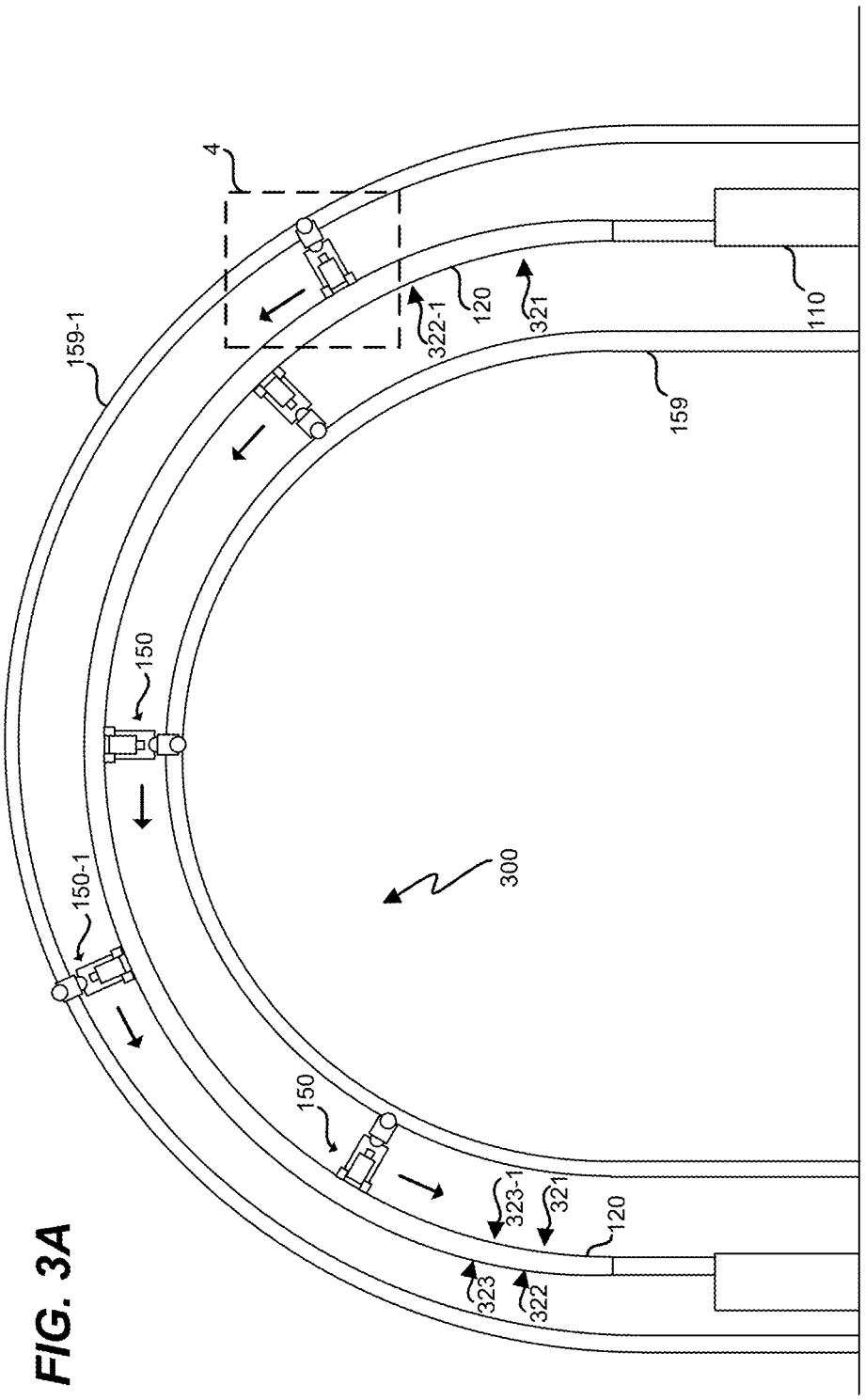
FIGS. 3A-3B are front views of NDI stations inspecting arcuate sections of fuselage in an illustrative embodiment.

FIG. 3A is a front view of an NDI station 300 inspecting the half barrel section 120 in an illustrative embodiment. In FIG. 3A, the NDI station is subdivided into one or more frames 159-1 (performing work on an OML 122) and frame 159 (performing work on an IML 128) (e.g., inner and/or outer frames 159, 159-1 that are complementary to an IML 128 and/or OML 122 of the half barrel section 120). The half barrel section 120 is carried along a track 110, and NDI heads 150, 150-1 proceed along the frames 159, 159-1 to image the half barrel section 120 as desired while the half barrel section 120 is pulsed or continuously moved in a process direction 199 out of the page. In a further embodiment, the NDI heads 150, 150-1 or frames 159, 159-1 are translatable, and proceed/translate into or out of the page during a pause between full pulses 118 or pauses or between a micro pulse 149 in order to scan a portion of the half barrel section 120. Operation of the NDI heads 150, 150-1 is synchronized with full pulse 118 or micro pulse 149 and/or pauses based on indexing information indicating progress of the half barrel section 120 along assembly line.

Figure 3B:
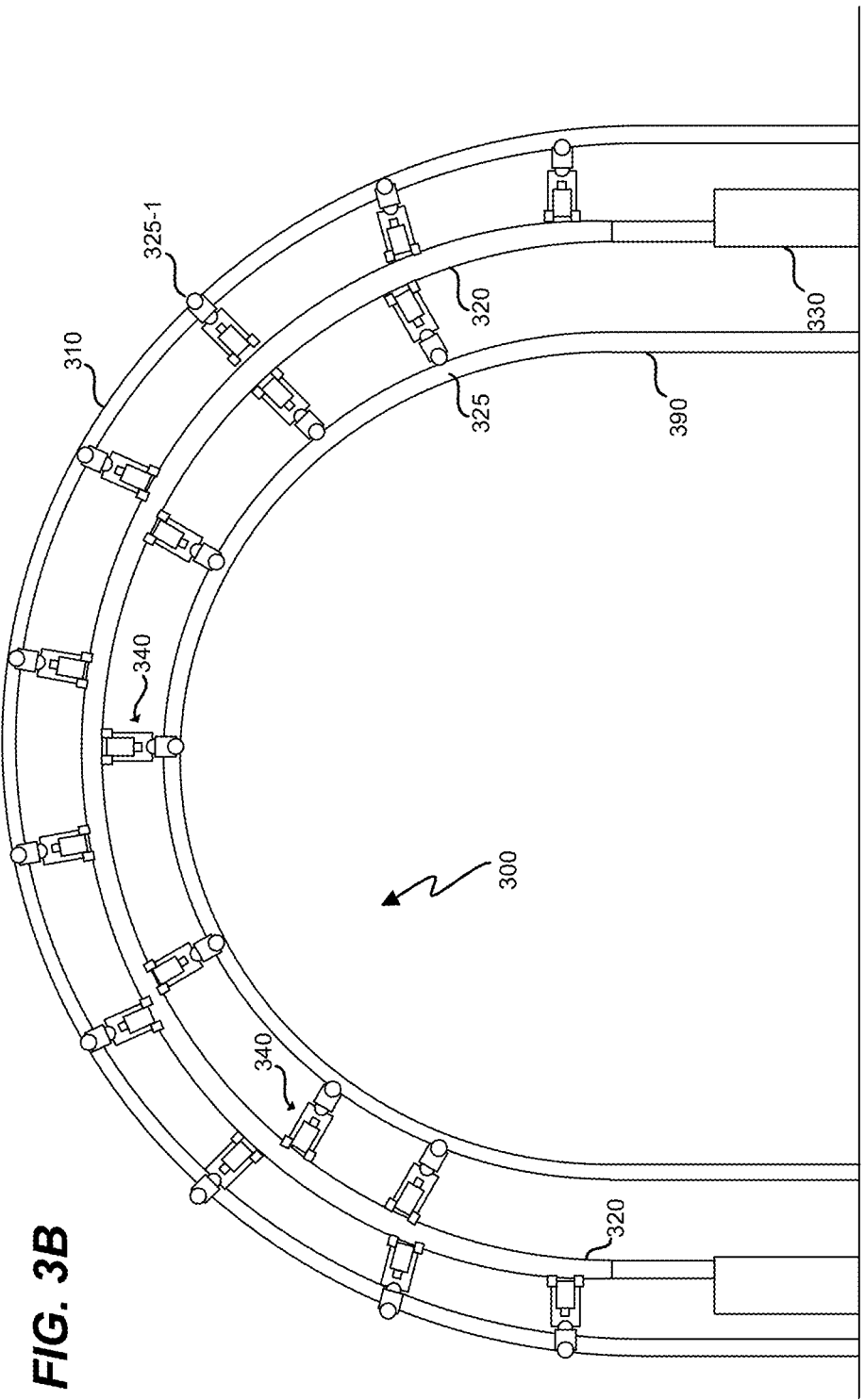

FIG. 3B is a front view of an NDI station 300 inspecting an arcuate section 320 of fuselage in an illustrative embodiment. In FIG. 3B, the NDI station 300 is subdivided into one or more outer frame 310 (performing work on an OML 122) and inner frame 390 (performing work on an IML 128) (e.g., inner and/or outer rings that follow an IML 128 and/or OML 122 of the arcuate section 320). The arcuate section 320 is carried along a track 330, and an array of NDI heads 340 are fixed at various circumferential positions 325, 325-1, yet are flexibly connected to their corresponding frames 310, 390 to enable a limited degree of deflection. The NDI heads 340 scan during movement, full pulse 118 or micro pulse 149 or continuous, of the arcuate section 320, the frames 310, 390 are moved in lengthwise direction 198 or the opposite direction during a pause of the arcuate section 320 in order to perform scanning. Operation of the NDI heads 340 is synchronized with full pulses 118 or micro pulses 149 and/or pauses based on indexing information indicating progress of the arcuate section 320 along the assembly line 100.

Figure 4:
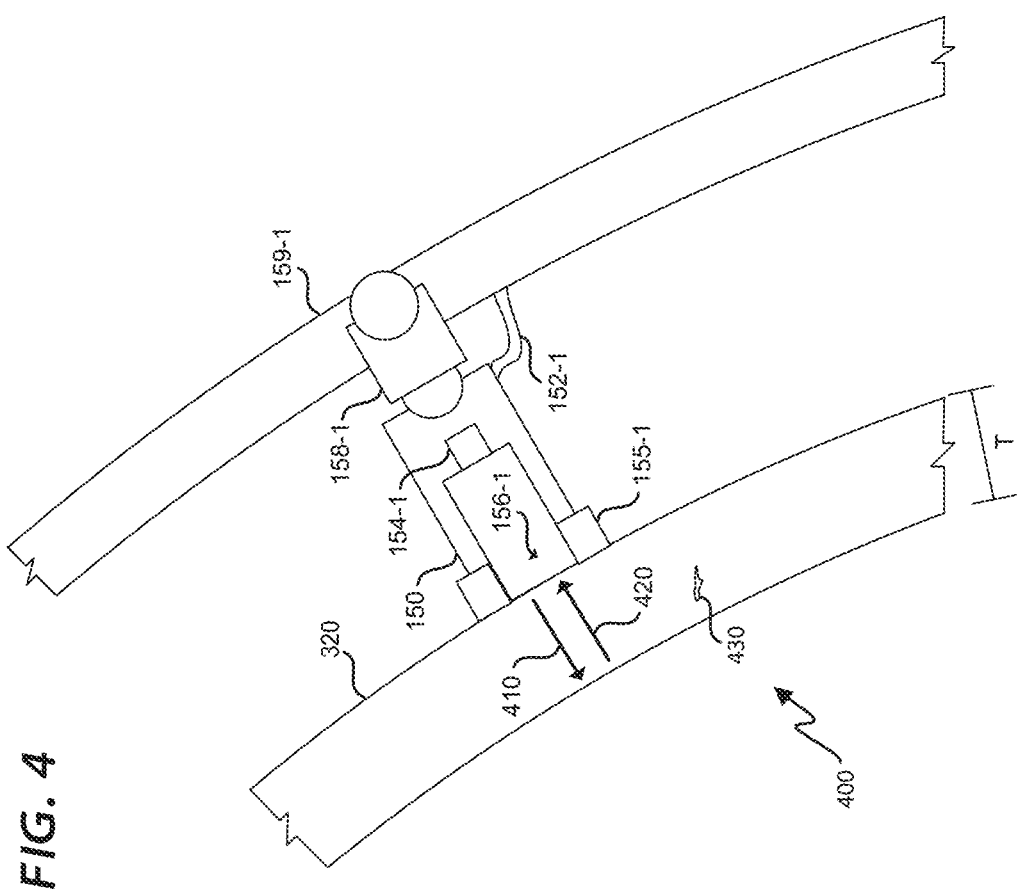
FIG. 4 is a zoomed in view of ultrasonic inspection in an illustrative embodiment.

FIG. 4 is a zoomed in view 400 of ultrasonic inspection in an illustrative embodiment and corresponds with region 4 of FIG. 3A. FIG. 4 illustrates feed lines 152-1 that supply water to ultrasonic transducers 154-1, which apply ultrasonic energy to the half barrel section 120 via chamber 156-1. Flexible face 155-1 and adjustable connection 158-1 maintain the NDI head 150-1 in contact with the half barrel section 120 as the half barrel section 120 and/or NDI head 150-1 is moved relative to the other.

According to FIG. 4, ultrasonic energy 410 is transmitted by ultrasonic transducer 154-1, and proceeds through a thickness T of the half barrel section 120. Then, reflected ultrasonic energy 420 is returned to the ultrasonic transducer 154-1, where it is sensed. Based on the timing and magnitude of reflected ultrasonic energy 420, as compared to an expected timing and magnitude of ultrasonic energy 420 for this particular location along half barrel section 120, internal inconsistencies 430 within the half barrel section 120 are detected.

Figure 5:
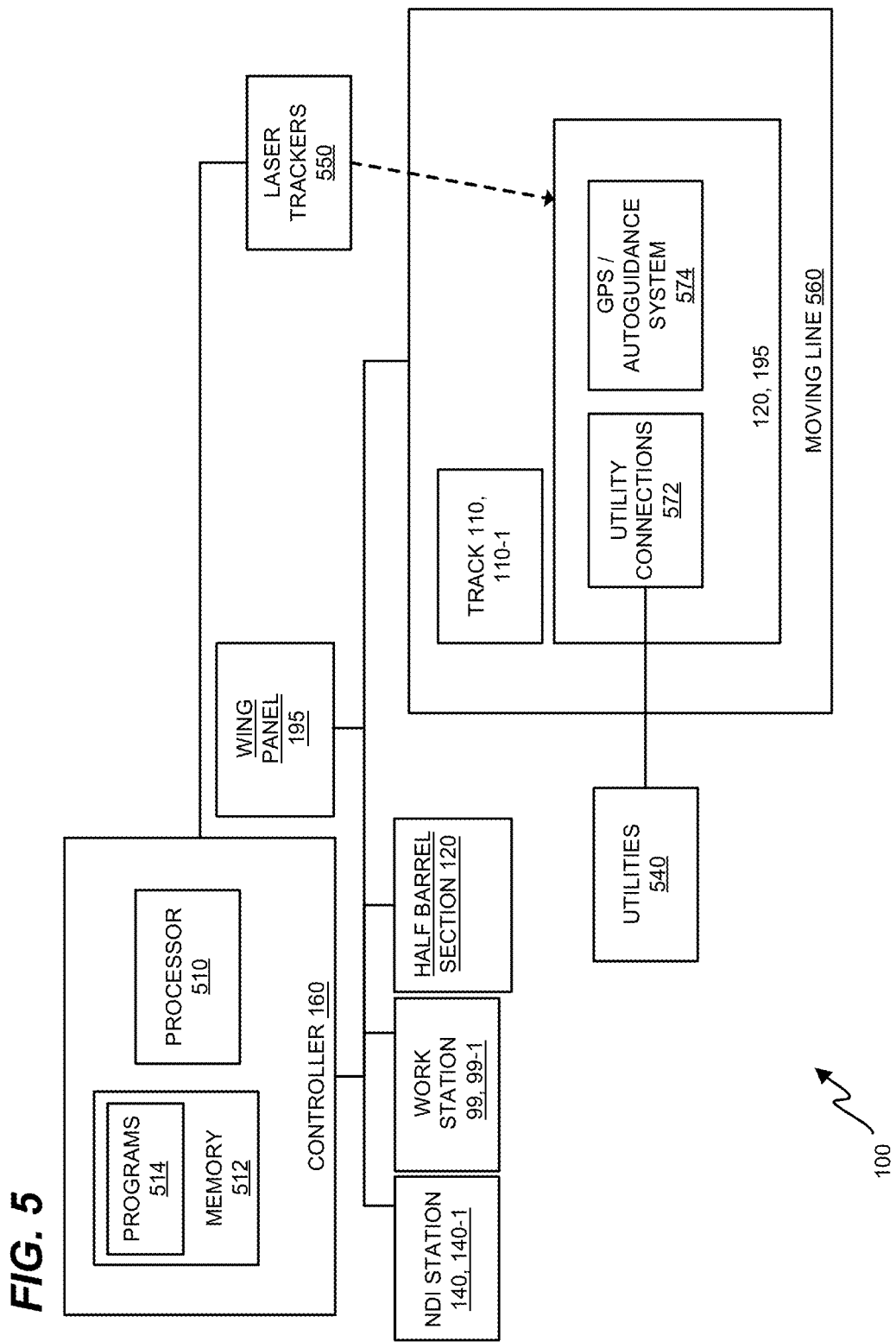
FIG. 5 broadly illustrates control components of a production system that performs ultrasonic inspection in an illustrative embodiment.

Attention is now directed to FIG. 5, which broadly illustrates control components of a production system that performs ultrasonic inspection in an illustrative embodiment. A controller 160 coordinates and controls operation of NDI station 140, 140-1, work station 99, 99-1 and movement of half barrel section 120 or wing panel 195 along assembly line 100 having a track 110, 110-1. The controller 160 may comprise a processor 510 which is coupled with a memory 512 that stores programs 514. In one example, the half barrel section 120 or wing panel 195 are driven along a moving line 560 that is full pulse 118, micro pulse 149 or driven continuously by the track 110, 110-1, which is controlled by the controller 160. In this example, the half barrel section 120 or wing panel 195 includes utility connections 572 which may include electrical, pneumatic and/or hydraulic quick disconnects that couple the track 110, 110-1, NDI station 140, 140-1 and/or work station 99, 99-1 with externally sourced utilities 540. In other examples, as previously mentioned, the half barrel section 120 or wing panel 195 progress along track 110, 110-1 with an Automated Guided Vehicles (AGVs) that include on board utilities, as well as a GPS/Autoguidance system 574. In still further examples, the movement of the half barrel section 120 or wing panel 195 is controlled using laser trackers 550. Position and/or motion sensors coupled with the controller 160 are used to determine the position of the half barrel section 120 or wing panel 195.

Figure 6:
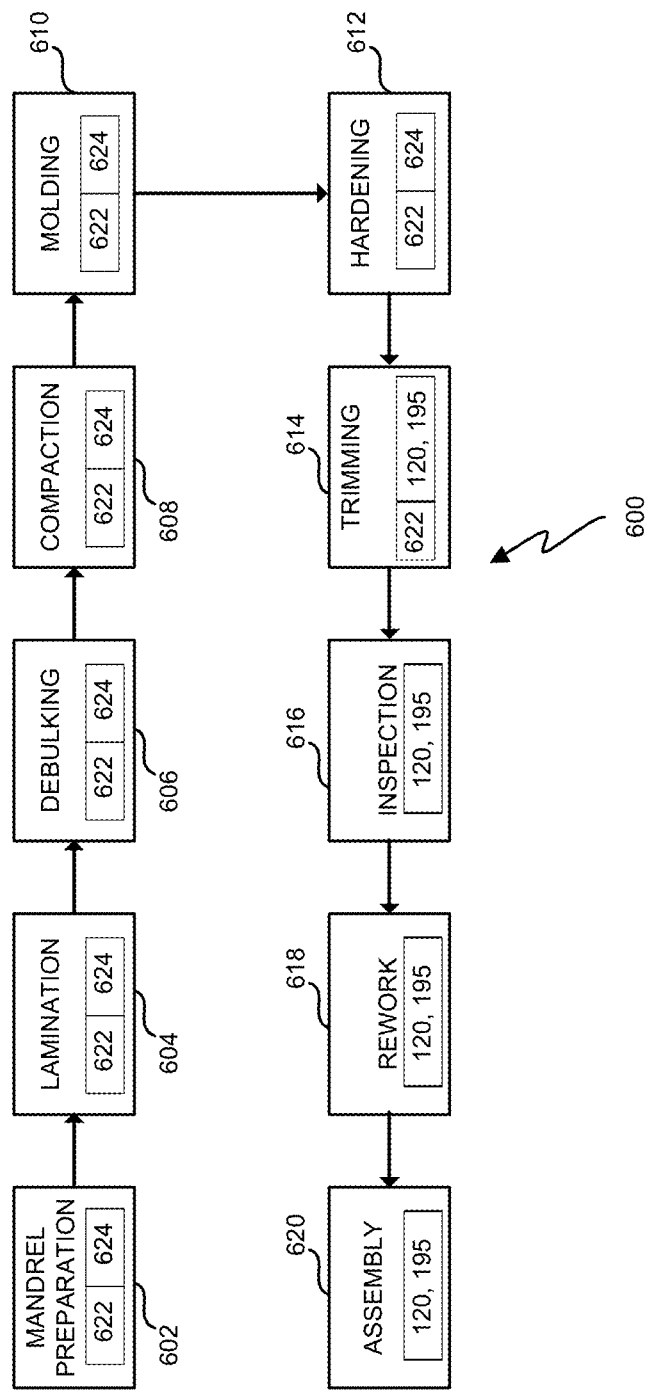
FIG. 6 illustrates an example of a moving line that incorporates a variety of operations that may be performed in the production of composite parts in an illustrative embodiment.

Principles of the moving line described above may include other types of operations that are normally performed in the production of composite parts. FIG. 6 illustrates an example of a moving line 600 that incorporates a variety of operations that may be performed in the production of composite parts. For example, the moving line may include a station, zone, or stand for mandrel preparation 602 involving cleaning or application of coatings to a mandrel 622, following which the mandrel 622 is transported to in lamination 604 where a preform 624 is formed upon mandrel 622. Preform 624 becomes either half barrel section 120 or wing panel 195 after hardening. The fully laid up preform may then be delivered on a moving line to downstream locations where debulking 606 and compaction 608 of the preform are performed. Further, the preform may be processed in additional locations where molding 610, hardening 612 of the preform into a composite part, trimming 614, inspection 616, rework 618 and/or assembly 620 operations are performed. Inspection 616 corresponds to NDI station 140, 140-1 and assembly corresponds to work station 99, 99-1. Mandrel 622 progresses from mandrel preparation 602 to lamination 604 to debulking 606 to compaction 608 to molding 610 through hardening 612 where preform 624 becomes either half barrel section 120 or wing panel 195 after hardening. Rough trimming of half barrel section 120 or wing panel 195 occurs at trimming 614. Demolding of half barrel section 120 or wing panel 195 from mandrel 622 also occurs at trimming 614 with mandrel 622 progressing to mandrel preparation 602.

EXAMPLES

In the following examples, additional processes, systems, and methods are described in the context of an NDI station.

Figure 7:
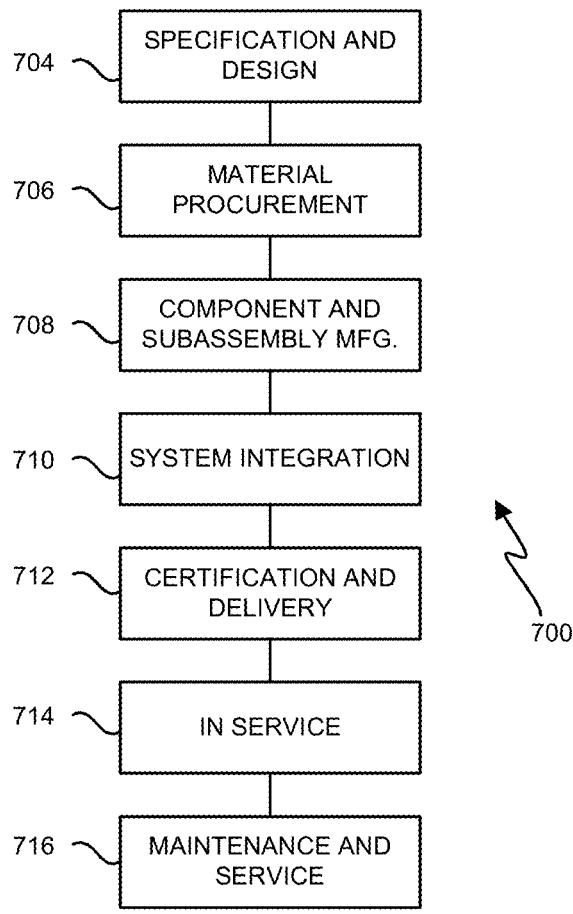
FIG. 7 is a flow diagram of aircraft production and service methodology in an illustrative embodiment.
Figure 8:
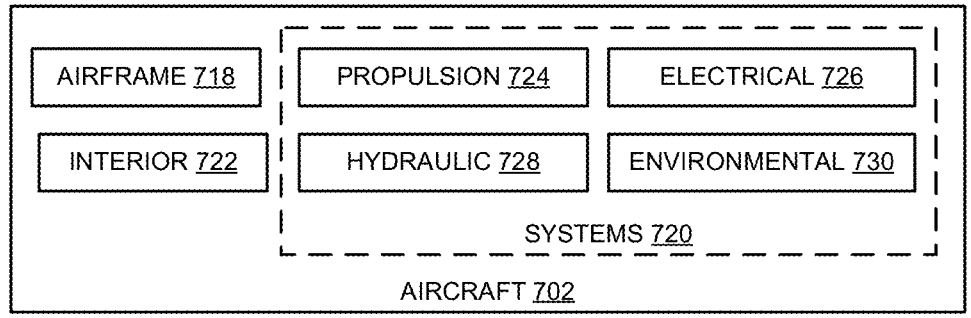
FIG. 8 is a block diagram of an aircraft in an illustrative embodiment.

Referring more particularly to the drawings, embodiments of the disclosure may be described in the context of aircraft manufacturing and service in method 700 as shown in FIG. 7 and an aircraft 702 as shown in FIG. 8. During preproduction, method 700 may include specification and design 704 of the aircraft 702 and material procurement 706. During production, component and subassembly manufacturing 708 and system integration 710 of the aircraft 702 takes place. Thereafter, the aircraft 702 may go through certification and delivery 712 in order to be placed in service 714. While in service by a customer, the aircraft 702 is scheduled for routine work in maintenance and service 716 (which may also include modification, reconfiguration, refurbishment, and so on). Apparatus and methods embodied herein may be employed during any one or more suitable stages of the production and service described in method 700 (e.g., specification and design 704, material procurement 706, component and subassembly manufacturing 708, system integration 710, certification and delivery 712, service 714, maintenance and service 716) and/or any suitable component of aircraft 702 (e.g., airframe 718, systems 720, interior 722, propulsion system 724, electrical system 726, hydraulic system 728, environmental 730).

Each of the processes of method 700 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 8, the aircraft 702 produced by method 700 may include an airframe 718 with a plurality of systems 720 and an interior 722. Examples of systems 720 include one or more of a propulsion system 724, an electrical system 726, a hydraulic system 728, and an environmental system 730. Any number of other systems may be included. Although an aerospace example is shown, the principles of the invention may be applied to other industries, such as the automotive industry.

As already mentioned above, apparatus and methods embodied herein may be employed during any one or more of the stages of the production and service described in method 700. For example, components or subassemblies corresponding to component and subassembly manufacturing 708 may be fabricated or manufactured in a manner similar to components or subassemblies produced while the aircraft 702 is in service. Also, one or more apparatus embodiments, method embodiments, or a combination thereof may be utilized during the subassembly manufacturing 708 and system integration 710, for example, by substantially expediting assembly of or reducing the cost of an aircraft 702. Similarly, one or more of apparatus embodiments, method embodiments, or a combination thereof may be utilized while the aircraft 702 is in service, for example and without limitation during the maintenance and service 716. For example, the techniques and systems described herein may be used for specification and design 704, material procurement 706, component and subassembly manufacturing 708, system integration 710, service 714, and/or maintenance and service 716, and/or may be used for airframe 718 and/or interior 722. These techniques and systems may even be utilized for systems 720, including, for example, propulsion system 724, electrical system 726, hydraulic 728, and/or environmental system 730.

In one embodiment, a part comprises a portion of airframe 718 and is manufactured during component and subassembly manufacturing 708. The part may then be assembled into an aircraft in system integration 710, and then be utilized in service 714 until wear renders the part unusable. Then, in maintenance and service 716, the part may be discarded and replaced with a newly manufactured part. Inventive components and methods may be utilized throughout component and subassembly manufacturing 708 in order to manufacture new parts.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

What is claimed is:

1. A method for inspecting a structure for inconsistencies, the method comprising:
 advancing the structure along a track in a process direction through a Non-Destructive Inspection (NDI) station comprising a frame comprising an arc following an Inner Mold Line (IML) of the structure;
 indexing the structure to the NDI station; and
 inspecting the structure with an NDI head mounted on the arc.

2. The method of claim 1, further comprising the NDI head characterizing internal features of a cross-section of the structure.

3. The method of claim 1 wherein:
 advancing the structure comprises pulsing the structure by less than a length of the structure; and
 advancing the structure, indexing the structure, and inspecting the structure are performed iteratively to characterize multiple cross-sections of the structure along the length of the structure.

4. The method of claim 1, further comprising inspecting the structure only during pauses between pulses of the structure.

5. The method of claim 1, further comprising:
 operating an array of NDI heads that are arranged at the NDI station following a contour of the structure; and
 combining input from the array of NDI heads and generating an image of a cross-section of the structure.

6. The method of claim 1, further comprising advancing the NDI head along a contour of the structure while operating the NDI head.

7. The method of claim 1, further comprising:
 detecting out of tolerance conditions based on internal features of the structure; and
 reporting the out of tolerance conditions for rework.

8. The method of claim 1, wherein inspecting the structure comprises performing ultrasonic pulse-echo inspection of the structure or through transmission ultrasound inspection.

9. The method of claim 1 further comprising:
 generating a model of the structure based on input from the NDI station;
 aligning the model to a design of the structure; and
 identifying discrepancies between the model and the design of the structure.

10. The method of claim 1 wherein:
advancing the structure in the process direction moves the structure through stations that perform work on the structure.

11. A non-transitory computer readable medium embodying programmed instructions which, when executed by a processor, are operable for performing a method for inspecting a structure for inconsistencies, the method comprising:
advancing the structure along a track in a process direction through a Non-Destructive Inspection (NDI) station comprising a frame comprising an arc following an Inner Mold Line (IML) of the structure;
indexing the structure to the NDI station; and
inspecting the structure with an NDI head mounted on the arc.

12. A system configured to inspect a structure for inconsistencies, wherein the system comprises:
a track along which structures advance in a process direction during fabrication; and
a Non-Destructive Inspection (NDI) station that is disposed at the track and comprises and arc that follows an Inner Mold Line (IML) of the structure:
at least one NDI head mounted on the arc and configured to characterize internal features of a cross-section of each structure.

13. An apparatus configured to inspect a structure for inconsistencies, wherein the apparatus comprises:
a Non-Destructive Inspection (NDI) station that comprises:
a frame that comprises an arc that follows an Inner Mold Line (IML) of the structure;
at least one NDI head mounted to the frame along the arc;
a track for advancing a structure relative to the NDI head; and
an index system for conveying information concerning the structure within purview of the NDI station.

14. The apparatus of claim 13 wherein:
the at least one NDI head comprises:
an ultrasonic transducer;
a flexible face;
a chamber between the ultrasonic transducer and the flexible face
a feed line that fills the chamber with liquid; and
an adjustable connection between the ultrasonic transducer and the NDI station.

15. The apparatus of claim 14 wherein the flexible face elastically deflects to conform to contours of the structure.

16. The apparatus of claim 14 wherein the adjustable connection enables deflection of the NDI head relative to the NDI station as the NDI head follows a contour of the structure.

17. The apparatus of claim 14 wherein:
the adjustable connection comprises a kinematic chain that operates in accordance with instructions in a Numerical Control (NC) program to advance the at least one NDI head along a contour of the structure.

18. The apparatus of claim 14 wherein:
the at least one NDI head comprises an array of NDI heads disposed along an arc along the frame.

19. The apparatus of claim 18 wherein:
the array of NDI heads follows a contour of the structure.

20. The apparatus of claim 13 wherein:
the arc along the frame is complementary in shape to the IML.

21. The apparatus of claim 18 wherein:
the arc along the frame follows an Outer Mold Line (OML) of the structure.

22. The apparatus of claim 21 wherein:
the arc along the frame is complementary in shape to the OML.

23. The apparatus of claim 13 wherein:
the at least one NDI head is translatable.

24. The apparatus of claim 23 wherein:
the at least one NDI head is translatable along an arc of the frame.

25. A method for inspecting a structure for inconsistencies, the method comprising:
advancing the structure along a track in a process direction through a Non-Destructive Inspection (NDI) station comprising a frame comprising an arc following an Inner Mold Line (IML) of the structure, wherein advancing the structure comprises pulsing the structure by less than a length of the structure;
indexing the structure to the NDI station;
inspecting the structure with an NDI head mounted on the arc, wherein inspecting the structure comprises operating an array of NDI heads that are arranged at the NDI station to follow a contour of the structure to characterize internal features of a cross-section of the structure during pauses between pulses of the structure by performing operations selected from a group comprising ultrasonic pulse-echo inspection of the structure and through transmission ultrasound inspection; and
combining input from the array of NDI heads to generate an image of a cross-section of the structure, wherein advancing the structure, indexing the structure, and inspecting the structure are performed iteratively to characterize multiple cross-sections of the structure along the length of the structure;
detecting out of tolerance conditions based on internal features of the structure;
reporting the out of tolerance conditions for rework;
generating a model of the structure based on input from the NDI station;
aligning the model to a design of the structure; and
identifying discrepancies between the model and the design of the structure.

26. A system for inspecting structures for inconsistencies, the system comprising:
a track along which structures advance in a process direction during fabrication; and
a Non-Destructive Inspection (NDI) station that is disposed at the track and that inspects the structures for inconsistencies, the NDI station comprising:
a frame comprising an arc that follows a contour of the structure, wherein the arc follows an Inner Mold Line (IML) of the structure and an Outer Mold Line (OML) of the structure; and
an array of NDI heads that characterize internal features of a cross-section of each structure, wherein the array of NDI heads is disposed along the arc of the frame, and wherein each NDI head is translatable and comprises:
an ultrasonic transducer;
a flexible face that elastically deflects to conform with a contour of the structure;
a feed line that fills a chamber between the ultrasonic transducer and the flexible face with liquid; and
an adjustable connection that enables deflection of the NDI head relative to the NDI station as the NDI head follows the contour of the structure, wherein the adjustable connection comprises a kinematic chain that operates in accordance with instructions in a Numerical Control (NC) program to advance the NDI head along a contour of the structure.

27. An apparatus for inspecting a structure for inconsistencies, the apparatus comprising:
 a Non-Destructive Inspection (NDI) station, the NDI station comprising:
  a frame, wherein the frame comprises an arc along the frame that follows an Inner Mold Line (IML) of the structure and is complementary in shape to the IML, and wherein the arc along the frame follows an Outer Mold Line (OML) of the structure and is complementary in shape to the OML;
 an array of NDI heads mounted to and disposed along the arc along the frame, following a contour of the structure, wherein each NDI head is translatable along the arc of the frame and comprises:
  an ultrasonic transducer;
  a flexible face that elastically deflects to conform to contours of the structure;
  a chamber between the ultrasonic transducer and the flexible face;
  a feed line that fills the chamber with liquid; and
  an adjustable connection between the ultrasonic transducer and the NDI station, wherein the adjustable connection comprises a kinematic chain that operates in accordance with instructions in a Numerical Control (NC) program to advance the NDI head along a contour of the structure, and wherein the adjustable connection enables deflection of the NDI head relative to the NDI station as the NDI head follows the contour of the structure;
 a track for advancing a structure relative to the NDI head; and
 an index system for conveying information concerning the structure within purview of the NDI station.

* * * * *